INVENTORS
J. H. AUER JR. AND
J. P. HUFFMAN

THEIR ATTORNEY

INVENTORS
J.H. AUER JR. AND
J.P. HUFFMAN
BY
Forest B. Hitchcock
THEIR ATTORNEY

Oct. 21, 1969    J. H. AUER, JR., ET AL    3,474,400
SONIC PRESENCE DETECTION SYSTEM AND METHOD
Filed April 7, 1967    9 Sheets-Sheet 5

INVENTORS
J. H. AUER, JR.
J. P. HUFFMAN
BY
Forest B. Hitchcock
THEIR ATTORNEY

——— END OF VEHICLE GATE
— — — PAVEMENT REFLECTION

Oct. 21, 1969    J. H. AUER, JR., ET AL    3,474,400
SONIC PRESENCE DETECTION SYSTEM AND METHOD
Filed April 7, 1967    9 Sheets-Sheet 7
FIG. 7A
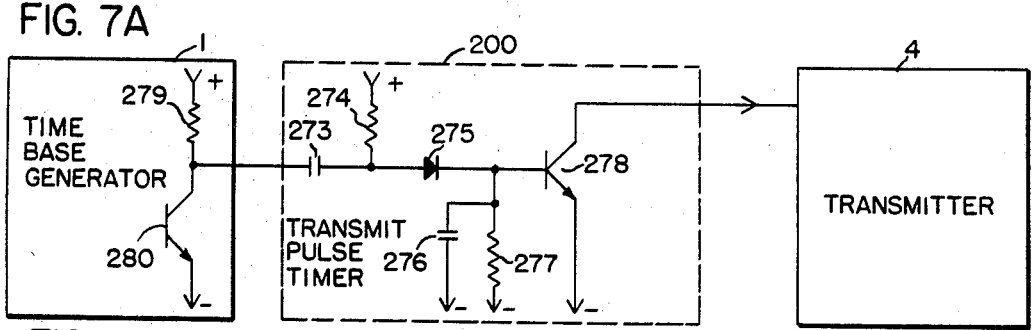
FIG. 7B
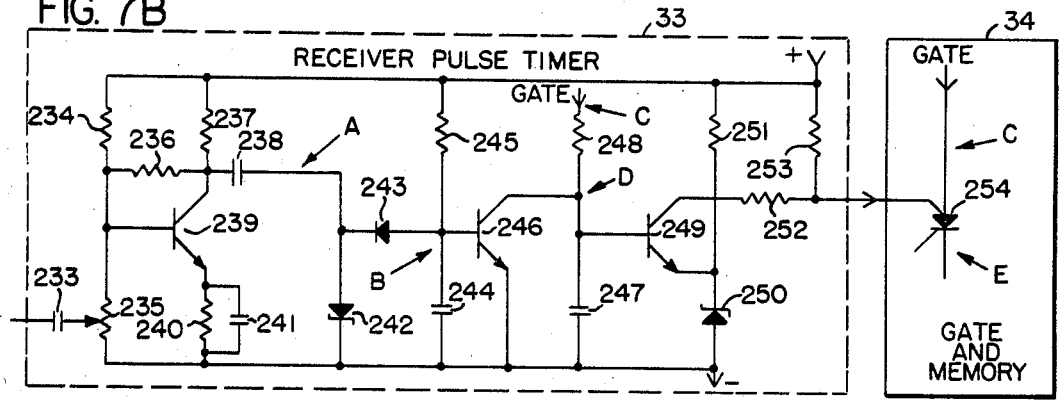
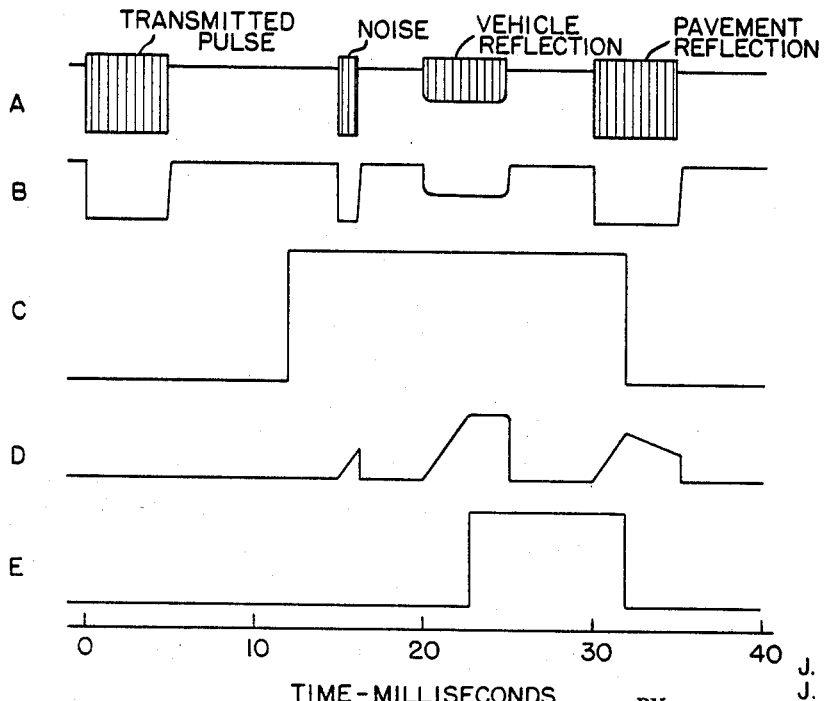
FIG. 7C
INVENTORS
J. H. AUER, JR.
J. P. HUFFMAN
BY
Forest B Hitchcock
THEIR ATTORNEY United States Patent Office 3,474,400
Patented Oct. 21, 1969

3,474,400
SONIC PRESENCE DETECTION SYSTEM AND
METHOD
John H. Auer, Jr., Fairport, and Jerry P. Huffman,
Rochester, N.Y., assignors to General Signal Corporation, Rochester, N.Y., a corporation of New York
Continuation-in-part of application Ser. No. 444,147,
Mar. 31, 1965. This application Apr. 7, 1967, Ser.
No. 641,086
Int. Cl. G01s 9/66
U.S. Cl. 340—1                    19 Claims

ABSTRACT OF THE DISCLOSURE

A system and method for indicating the presence of objects where sonic energy reflected from the surfaces of objects is recognized and detected. Sonic energy pulses are periodically directed toward objects to be detected and electrical signals are generated in response to that portion of the sonic energy reflected from the object's surface. The signals are conducted to a tuned amplifier gated at intervals corresponding to the anticipated transit times of reflected pulses. Recognition circuitry responds to a plurality of reflected pulses having a peculiar characteristic and producing an indication of object presence when they are coincident with the gate intervals. A timer extinguishes the presence indication when reflected pulses cease to be received for a period of time commensurate with a predetermined minimum rate.

RELATED APPLICATION

This application is a continuation-in-part of the application Ser. No. 444,147, filed Mar. 31, 1965 entitled Ultranonic Presence Detector which is now abandoned.

BACKGROUND OF INVENTION

The present invention relates to sonic detector systems and more particularly to systems capable of distinguishing and detecting reflected signals in the presence of generated and received noise.

Sonic detection systems find utilization in a number of applications, for example, traffic control and garage supervision. This invention describes a system primarily intended for the detection and indication of vehicle presence.

In a typical application, detection systems transmit short duration pulses of vibrational energy, preferably within the ultrasonic frequency region. These pulses are directed toward the vehicles by transducer apparatus which also produces electrical signals by responding to reflected energy from the roadway and vehicle surfaces. The roadway reflections are gated out of the system and have no effect upon its operation. Those signals reflected from the vehicle or object are recognized and produce a distinctive indication of vehicle or object presence. Thus, presence of a vehicle or object on the roadway is indicated whenever sufficiently strong reflections of sonic energy are received by the transducer apparatus.

In practice, systems using ultrasonic techniques have proven substantially successful and adaptable to various environments and targets. However, due to the nature and design of those presently deployed systems, all in varying degrees are limited by certain operational deficiencies. Primarily these deficiencies may be related to the inability of the systems to adequately distinguish false signals, either generated within the system or present in the enironment, from signals actually reflected from the surface of the vehicle or object under scrutiny. Noise or false signals mainly result from electrical coupling within the system and ringing or continued vibration of the sonic transducer after transmission of each sonic pulse. The latter source of noise is particularly troublesome with systems contemplating the use of a single sonic transducer for both transmitting and receiving. Other noteworthy problems to be overcome in the organization of an improved detector system concern variations in sonic transmission speed due to ambient temperature changes, and variations in reflected signal strength caused by the different shapes, sizes and materials of the vehicles or objects.

SUMMARY OF THE INVENTION

The present invention contemplates an ultrasonic vehicle presence detector having transducer means normally emitting timed spaced compressional wave pulses, and responding to reflections of the pulses for converting them to produce respective electrical pulses. Gating means manifests a gated interval during each of the time spaces and means generate a coincident signal during each gated interval when an electrical pulse produced during that interval by the transducer means is above a given level. Accumulating means accumulates a signal level in accordance with the number of coincident signals generated and normally inactive switching means is rendered active only when a plurality of coincident signals is stored by the accumulating means. Means intermittently partially discharge the accumulating means so that the accumulating means must store two coincident signals generated during successive gated intervals in order to attain a signal level sufficient to render the switching means active. Means renders the switching means inactive after cessation of the electrical pulses.

Another aspect of the present invention is a vehicle presence detection system in which means periodically emit pulses of sonic energy having a peculiar characteristic distinguishing from coupled noise and respondingly generates signals relative to received sonic energy including sonic energy reflected from the object. Means generate a periodic gate signal for a selected interval between successive sonic energy pulses and recognition means is operably controlled by said period gate signal to be actuatable during said selected interval by only electrical signals having a characteristic correlative to said peculiar characteristic. Detection means rendered operable only by plural actuation of the recognition means within a predetermined span of time manifests a distinctive indication of object presence.

In accordance with the present invention there is also contemplated a method for detecting the presence of vehicles. Periodical pulses of sonic energy having a peculiar characteristic distinguishing from coupled noise are emitted and signals relative to sonic energy reflected from the vehicles are generated. Only signals having attributes correlative to the peculiar characteristic during selected intervals are recognized. A distinctive indication of vehicle presence is established whenever a plurality of signals is recognized during a predetermined span of time.

The invention herein disclosed overcomes each of the outlined operational deficiencies and problems, and constitutes an improved detector system capable of performing adequately under the environmental conditions and operating limits normally specified. Mainly the desired performance is achieved in accordance with the improvements and modifications broadly outlined in the following paragraphs.

To prevent false indication of vehicle or object presence in response to the receipt of extrinsic signals or sonic energy not related to the vehicle or object, conditions are imposed on the response of the system. The transmitted pulses are controlled to have an interval greater than that characteristic of the environmental or generated noise. This unique signal duration permits restricting system response to sonic energy pulses possessing a time duration correlative to the initial transmission. In addition, the discrimination of the system with regard to noise is further enhanced by requiring that not only the received pulses have the desired duration, but also that they be received and recognized by the system during a plurality of recognition intervals. Depending upon the desired parameters of system performance, this plurality of received pulse condition may be extented to any number of desired pulses and may or may not be limited to their occurrence during successive intervals. Thus a system may be organized to respond on a first pulse only, two or more successive pulses, or a plurality of pulses occurring within a predetermined interval. Of course a system that responds on a single pulse is in effect dependent only upon the duration of received signals. Actual environmental conditions and required operational performance determine which condition of signal response is to be employed. It is obvious however that the peculiar time duration condition in coordination with a plurality pulse requirement provides a high probability that only signals reflected from the surfaces of vehicles or other objects to be detected will be recognized by the system.

False signals produced by the ringing of the sonic transducer, i.e., the continued vibration of the transducer in response to but after cessation of a transmitted pulse, are, however, not eliminated by the aforementioned recognition condition. Ringing signals, either produced by coupling in a multiple transducer system or by direct introduction in a single transducer system are indistinguishable from true reflections. They possess the same or similar characteristics and further occur on a periodical basis. An obvious method to overcome such signals, which has been employed in prior art systems, is to sufficiently delay the response of the receiver so as to gate out the transducer vibrations. Since the vibrations encompass a readily predictable and defined length of time, this is accomplished by delaying the gate interval a commensurate time. In turn, however, this prevents recognition of reflected signals from vehicles such as buses or trucks having surfaces close to the transducer, as well as in side-fire applications where a vehicle may pass a relatively short distance from the transducer. For in these instances, a pulse may be quickly reflected from the surface but fail to be detected due to the delay of the recognition or gate interval. In this invention the recognition delay is of relatively negligible time with respect to reflected target signals and ringing signals are avoided by controlling the gain of the receiver amplifier in a manner as to establish a relatively low or zero gain during the time when ringing signals are or could be present, and a maximum or increased gain after such period. Thus, since the amplitude of the ringing signals follow a rapidly descending function, at the beginning of the recognition time or gate period only those pulses representing true object reflections have sufficient magnitude to generate object presence indications.

Changes in temperature introduce significant variations in the speed of sound and thus directly affect the transit time of a sonic pulse reflected from the body of a vehicle or object. Since the recognition circuitry of this invention is controlled to only be responsive during those intervals related to the anticipated transit time of a target reflection, any significant change in the speed of sound may cause the gate interval to encompass the signal reflected from the roadway, thus indicating a vehicle presence irrespective of receipt of a vehicle object signal. Compensation for this is accomplished by the use of a temperature sensitive element in that portion of the system generating the gate signals defining the recognition periods. As the ambient temperature rises and the speed of sound increases, the duration of the gate signal is shortened and conversely as temperature decreases the duration is increased. This shortening or lengthening of the gate interval effectively allows the duration of the recognition period to correspond with the change in transit time of signals reflected from the roadway.

The level of signal to which a system must respond is determined by the relative strength of the signals reflected from the object to be detected. Thus, the indication threshold is placed at a magnitude corresponding to the anticipated level of reflected energy. Due to the variation in the reflective surfaces of vehicles, signal returns may fall below this anticipated threshold particularly when the threshold must be set sufficiently high to distinguish from ambient noise. Such apparent loss of signal is obviated by two separate contributions to system performance. Firstly, the indication circuitry is organized in a bistable manner, i.e., once detection is made the indication is forced into a second stable state which resists change until a change command is given; and secondly, upon detection the system gain is altered to operate at a higher level assuring that continued vehicle reflections will be sensed and detected. This latter method of maximizing gain may be introduced, upon the detection of vehicle presence or may be introduced immediately after a period of time sufficient to avoid ringing signals from the transducer apparatus. Of course, at all times the rise in gain must be determined relative to the level of existing noise and system stability. The previously described incorporation of preconditioned recognition, however, does permit a high level of gain to be used.

Briefly, in operation the system incorporates the foregoing improvements as well as other innovations in the following manner. A time base generator furnishes repetitive pulses for keying a transmitter and gate generator. The transmitter pulses having a specific duration and frequency are converted to sonic energy and emitted by transducer apparatus. The transducer apparatus responds to reflections of the transmitted sonic pulses from all surfaces falling within its effective radiation zone, generating electrical signals commensurate with those reflections. In the case of a single transducer system, a receiver isolator limits signals to the receiver amplifier circuitry from the transducer at such times as the transducer is transmitting sonic pulses while still allowing smaller signals to be received. In the instance of a system using separate transducers for transmitting and receiving a receiver isolator is not necessarily employed.

An amplifier, tuned to the particular frequency of the sonic pulse, is controlled so that its gain is substantially zero at all times other than those corresponding to the interval defined by the gate signal generator. During this gate period the gain of the amplifier is varied in accordance with a selected function and/or the acquisition of vehicle presence. The amplifier output is conducted to the recognition circuitry which by means of a pulse timer correlates the duration of the received pulses to that of the transmitted pulses and produces an output in response to any pulse of greater than a predetermined minimum duration. The recognition circuitry is rendered operably responsive by the gate signal during substantially the same interval as the tuned amplifiers.

In applications where the existing noise conditions and required performance permits, recognition is dependent on only the time duration characteristic of the received pulses. However, in those instances where a higher degree of security from noise is demanded, both unique time character as well as a plurality of received pulses are required to provide an indication of vehicle presence. Similarly, under other circumstances, the system may provide sufficient immunity to false indication by requiring only a plurality of received pulses without the unique pulse duration.

Assuming a system having both pulse width recognition and plurality pulse detection, after a reflected vehicle or object signal is recognized by the pulse timer, the plurality pulse detector generates an output if two received signals are recognized for two respective successive or consecutive transmit cycles, a cycle comprising the time between the initiation of a transmit signal and the next succeeding. Dependent upon actual operational requirements, the plurality pulse detector may be organized to only respond to more than two pulses in either two or more successive or non-successive cycles.

After receipt of the required number of signals, a detector memory is altered to indicate an output relative to vehicle presence. The detector memory is bistable in nature so as to avoid loss of detection upon momentary loss of reflected signals. To extinguish this bistable memory, a release timer is provided, which unit is energized at the commencement of an indication and which extinguishes the indication if signals are not recognized by the pulse timer at a rate greater than a predetermined minimum. The release time constant of the release timer is established so as to be commensurate with such minimum rate. In detection systems where in addition to indication of vehicle presence, a determination of lane occupancy is required, i.e., the length of time a vehicle is detected relative to the duration of a defined interval, the time constant of the timer unit must be selected so as to be compatible with this determination. Thus, where a plurality of received reflected signals is required, resulting in a time delay prior to indication of vehicle presence, the release timer must allow maintenance of the vehicle presence indication for a duration commensurate with the initial delay. This permits the system to detect the vehicle or object for a period of time in accordance with its actual presence in the detection zone irrespective of the initial indication delay. Where indication is dependent upon only the time character of a single reflected pulse this added maintenance of vehicle presence indication may be inapplicable to determination of lane occupancy. The parameter of lane occupancy is an average value and the minor variations in actual detection duration due to system peculiarities and practical circuit considerations become relatively inconsequential.

In general, the aforedescribed system contemplates a sonic presence detector incorporating a high degree of security against false indications of vehicle or object presence. It accomplishes this by demanding that certain recognition conditions be met by reflected signals prior to the initiation of a presence indication. It is therefore an object of this invention to provide a presence detector of the sonic type which is highly immune to false actuation by reception of spurious sonic pulses.

Another object is to provide a sonic detector capable of distinguishing actual target signals from those noise signals produced by intra circuitry electrical coupling.

Another object of this invention is to provide a detection system using a single transducer for both transmitting and receiving energy pulses.

Another object is to provide a detector requiring receipt of a predetermined number of pulses prior to producing output manifestation of vehicle presence.

Another object of the invention is to provide a system which indicates vehicle presence upon the receipt of pulses possessing characteristics uniquely correlative to the transmitted pulses.

Another object is to provide a sonic detector system wherein presence indication is manifested upon the receipt of a plurality of pulses during a particular interval having characteristics uniquely correlative to the transmitted pulses.

Yet another object of the present invention is to provide a vehicle detector incorporating a timer providing for the maintenance of vehicle presence indication after a cessation of received signals for a period commensurate with the initial delay in indication.

The foregoing objects and features of the present invention are clearly outlined and explained in the drawings and detailed description.

DESCRIPTION OF DRAWINGS

The drawings contain the following:

FIG. 7A is a combination block diagram and functional schematic showing circuitry providing the unique time character of the transmitted pulses.

FIG. 7B is a functional block and schematic diagram showing the circuitry required for recognizing the duration of received pulses and the output signal circuitry relative to such recognition.

FIG. 7C is a graphical presentation of wave shapes present at various points in FIG. 7B for explanatory purposes.

The drawings are intended to be illustrative and explanatory of the invention; they are not intended to limit the scope of the invention in any manner.

Standard electrical symbols are utilized with positive voltage indicated by a (+) sign and/or reverse arrowhead and negative voltages being indicated by a (−) sign and/or a ground or arrow symbol.

The circuitry shown is typical of that actually used in practical applications and it is to be kept in mind that other circuitry fulfilling the same or similar functions may be utilized within the comprehension of the present invention.

DESCRIPTION OF THE PROPOSED EMBODIMENTS

Figure 3:
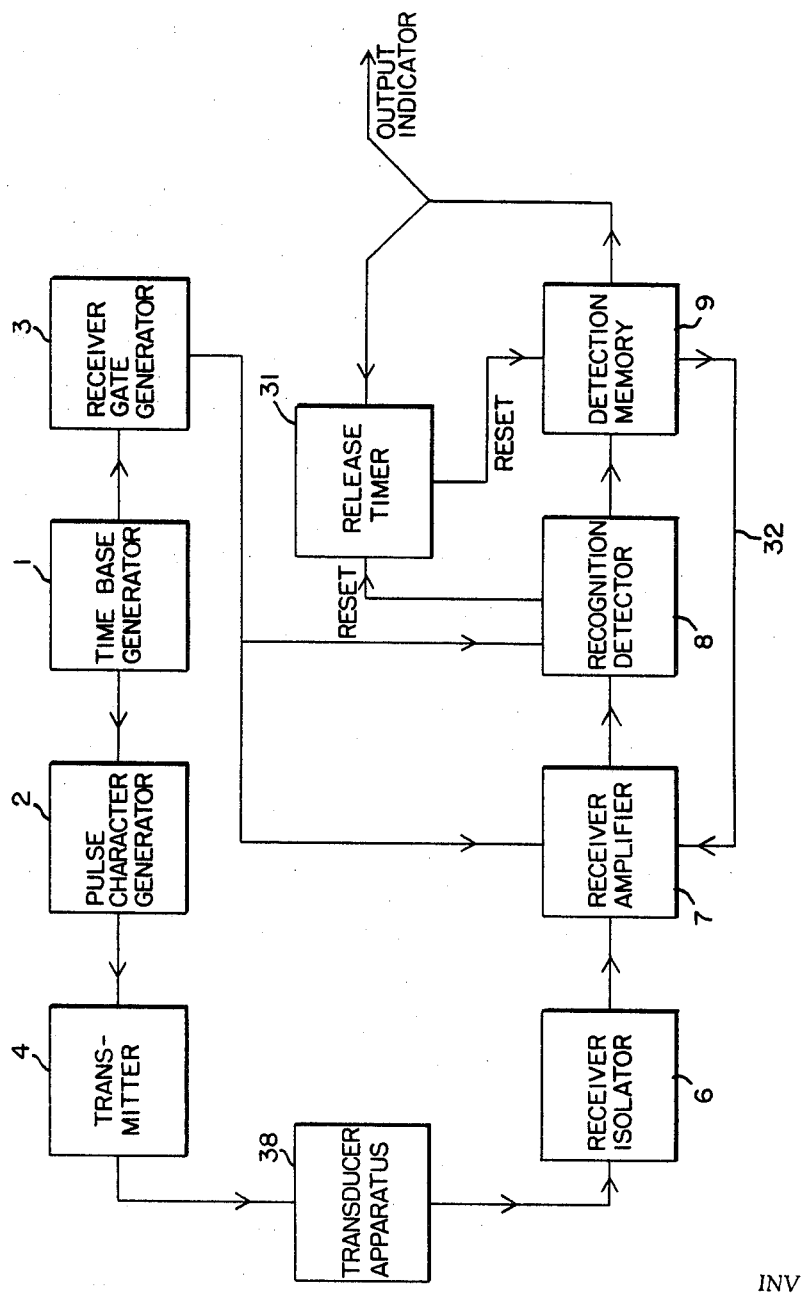
FIG. 3 is a functional block diagram of a vehicle detector showing the general organization of a system incorporating pulse recognition.

FIG. 3 shows a detection system incorporating pulse recognition and detection in which a time base generator 1 containing a free-running oscillator of the multivibrator or other similar type generates pulses of desired repetition rate. The time base generator 1 has two outputs alternately producing pulses. The alternate pulses are used to control a receiver gate generator unit 3 and a transmitter pulse character generator 2 respectively.

The pulse character generator 2 produces a pulse having an identification characteristic different to the noise signals either generated or received by the system. A transmitter 4 is controlled to transmit an electrical signal of substantially a single sonic frequency possessing the same identification characteristic. The transduced apparatus 38 responds to the transmitter 4 by converting the transmitter 4 electrical signals into a vibratory output of substantially the same frequency and characteristic. It also responds to reflected or environmental sonic energy by generating electrical signals. Thus the transducer apparatus 38 respondingly produces electrical signals corresponding to environmental sonic noise and reflected sonic signals.

The receiver gate generator 3 when keyed by the time base generator 1 provides a system gate signal activating the receiver circuitry for periods of time relative to the anticipated receipt of reflected signals from the targets. The receiver isolator unit 6 conducts the electrical signals to the receiver amplifier and provides the desired impedance levels for the transducer apparatus. It is primarily needed in applications where a single transducer for both transmitting and receiving is utilized. The receiver amplifier 7 is tuned to the sonic frequency of the transmitted pulse and thus is primarily responsive to only those signals containing energy within its band. The gate signal supplies bias voltage to the first stage of the receiver amplifier 7, and thus controls its response. When no gate signal is present, the gain of the receiver amplifier 7 is essentially zero while during the gate signal interval it reaches a value determined by the parameters of the circuit. This gain control prevents the amplifier from responding to signals received at times other than those anticipated for reflected target signals. Amplifier gain is also modified during the gate interval by other circuitry to further control the response of the system to ringing signals and variations in signal strength. These controls will be more fully described in ensuing detailed descriptions.

The recognition detector 8 responds only to those amplified signals having the peculiar identification characteristic of the transmitted pulse. As is clearly explained in specific embodiments later described, if the received electrical signal is coincident with the gate signal and has a characteristic correlative to the peculiar character of the transmitted pulse, the recognition detector 8 circuitry will respond. Again, as later analyzed in detail, the recognition detector 8 circuitry may be conditioned to respond only to a plurality of reflected signals received within a particular selected interval ranging over a number of transmission cycles. Should the requirements of the recognition detector 8 be met, it initiates an alteration in the detection memory 9.

The detection memory 9 when altered to a second stable state, produces a distinctive indication of vehicle presence and also causes a release timer 31 to be activated. Should signals be produced by the recognition detector 8 at a rate greater than a predetermined minimum, the release timer, once actuated, is prevented from producing an output signal. At such time, however, as recognition detector 8 signals cease, relative to the removal of the object or vehicle from the detection zone, the release timer 31 times out and extinguishes the presence indication in the detection memory 9, thus conditioning the system for detection of succeeding vehicles or objects. The detection memory 9 contains a feedback feature represented by line 32 which increases the gain of the receiver amplifier after detection is accomplished. The increased gain prevents loss of recognition due to reductions in reflected signal strengths.

The remaining descriptions of the invention are directed to various forms and alternate configurations utilized in the meeting of specific application requirements. Forms using two separate transducers as well as a single transducer are described in detail. Embodiments using multiple pulse detection or both pulse recognition and multiple pulse detection are also detailed. It must therefore be kept in mind that the various forms shown are intended to show equipment organizations conforming to the exigencies of practical applications and not necessarily providing the maximum security available for any given situation.

Figure 1:
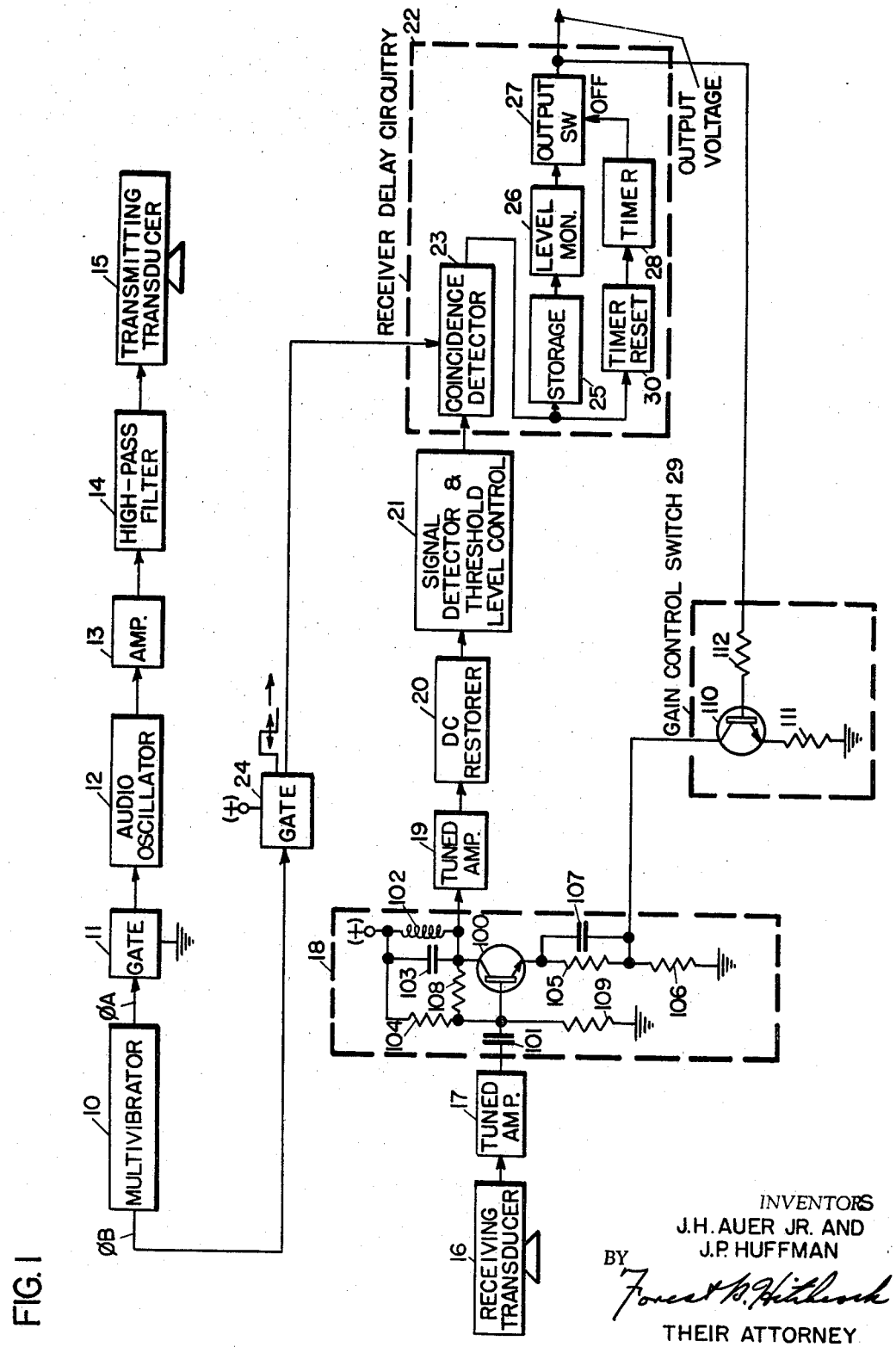
FIG. 1 is a block diagram and schematic combination of a vehicle detection system using only a two successive pulse condition for recognition and detection of vehicle presence.

Turning first to FIG. 1, there is shown a free-running multivibrator 10 which establishes a repetition rate for the transmitted compressional wave pulses. The multivibrator includes a pair of outputs, whereby pulses are produced alternately on each of the outputs in a manner well-known in the art. These alternate output pulses are designated $\phi$A and $\phi$B. Output pulses of phase $\phi$A are supplied to a normally-closed gate 11 which, in turn, controls operation of an audio oscillator 12, preferably operating at an ultrasonic frequency. Gate 11 preferably comprises a transistor switch which, when rendered conductive, renders an amplifying transistor in the oscillator tank circuit nonconductive thereby preventing oscillation. The conductive mode of the transistor switch in gate 11 thereby represents the closed condition of the gate. While gate 11 is closed, audio oscillator 12 is prevented from oscillating. However, once for each of the $\phi$A pulses, gate 11 is opened for a brief interval, during which the amplifying transistor of audio oscillator 12 is rendered conductive. During this interval, the audio oscillator produces its output signal. Each ultrasonic pulse so generated is supplied to a transmitting transducer 15 through an amplifier 13 and a high-pass filter 14 which attenuates the audible sidebands of the modulated signal. Consequently, ultrasonic energy pulses are repeatedly directed by transducer 15 toward the objects or vehicles to be detected, at a rate determined by the pulse repetition rate of the $\phi$A pulses produced by multi-vibrator 10. The width of each pulse, which may be on the order of one millisecond, is determined by the length of each interval during which gate 11 is open, while the repetition rate may be altered by changing the circuit parameters of multi-vibrator 10.

Each transmitted compressional wave pulse is reflected from either a background surface such as a roadway, or from the object or vehicle intended to be detected. The reflected ultrasonic energy pulses act upon a receiving transducer 16, which responds by supplying corresponding electrical pulses to a tuned amplifier 17. This amplifier tends to amplify only the desired ultrasonic frequency components of the reflected compressional wave energy. Output voltage produced by tuned amplifier 17 is supplied to the input of a second tuned amplifier 18, the output of which is coupled to the input of a third tuned amplifier 19. Although three tuned amplifier stages are shown in FIG. 1, it may also be feasible to utilize a different number of such stages, or a number of such stages in combination with a number of non-tuned amplified stages.

Tuned amplified 18 includes a transistor 100 receiving base input voltage from tuned amplifier 17 through a coupling capacitor 101. A tuned tank circuit comprising an inductor 102 in parallel with a capacitor 103 is connected to the collector of transistor 100. Collector bias is furnished through inductor 102, while base bias is supplied through a resistor 104. Emitter bias is developed across a pair of series-connected emitter resistors 105 and 106. Resistor 105 is by-passed to current of ultrasonic frequency by a capacitor 107 coupled to the emitter of transistor 100. A resistor 108 couples the collector of transistor 100 to the base for the purpose of providing negative feedback in order to maintain A.C. stability of tuned amplifier 18. Input signals to the tuned amplifier are developed across a base biasing resistor 109 connected between the base of the transistor and ground.

When input signals are supplied to tuned amplifier 18 at the resonant frequency of the tank circuit comprising inductor 102 and capacitor 103 the tank circuit presents a high impedance to the collector of transistor 100, and large output voltage swings at the resonant frequency are developed across the tank circuit. However, frequencies received which are either above or below the resonant frequency of the tank circuit are effectively short-circuited by capacitor 103 or inductor 102, respectively, so that the collector voltage remains substantially unaffected thereby. In this fashion, selective amplification of desired frequencies is achieved.

Output voltage from tuned amplifier 19 is supplied to a D.C. restorer 20, the output of which, in turn, is applied to a signal detector and threshold level control 21. The purpose of D.C. restorer 20 and signal detector and threshold level control 21 is to provide means for rendering the ultrasonic detector output voltage responsive only to received signals having an amplitude above a predetermined value, in order to provide distinction between received signals reflected from vehicles or other objects to be detected and received signals occurring from multiple reflections, which are of smaller amplitude. Apparatus of this nature has heretofore been utilized in ultrasonic detectors, such as shown in H. C. Kendall et al. U.S. Patent No. 3,042,899, issued July 3, 1962.

Output signals from signal detector and threshold level control 21 are supplied to one input of a coincidence detector 23, which forms a portion of receiver delay circuitry 22. In addition, ØB pulses from multi-vibrator 10 are supplied to the input of a gate 24, which in turn supplies pulses to a second input of the coincidence detector. Gate 24 is preferably of circuit configuration similar to that of gate 11, and hence responds to each ØB pulse by opening briefly, thereby momentarily supplying a positive voltage to the second input of coincidence detector 23.

Each time coincidence detector 23 receives simultaneous pulses at each of its inputs, a single output pulse is provide therefrom to a storage circuit 25 and a timer reset circuit 30. Output voltage from storage 25 is supplied to the input of a level monitor circuit 26, which produces a signal when the output voltage of storage circuit 25 rises above a predetermined level. When this occurs, an output switch 27 responsive to the level monitor signal is rendered conductive, thereby providing presence detector output voltage indicative of presence of a vehicle or object. For proper operation, level monitor 26 is arranged to respond to a voltage on storage circuit 25 which is equivalent to that produced by a charge representing two consecutive coincidence detector output pulses.

Output pulses provided by timer reset circuit 30 maintain a timer circuit 28 in a quiescent state. If no pulses are produced by timer reset circuit 30 for a predetermined interval measured from the time at which the latest pulse is produced by the coincidence detector, then at the end of this time interval an output pulse is provided by timer 28. The timer output pulse returns output switch 27 to its nonconductive condition, thereby halting production of the presence detector output voltage. It should be noted that output switch 27, when once rendered conductive, remains conductive until a pulse is subsequently supplied thereto from timer 28.

A gain control switch 29 is connected in shunt with resistor 106 of tuned amplifier 18. The gain control switch comprises a transistor 110 having an emitter bias resistor 111. The collector is coupled to a point common to resistors 105 and 106, while the conductive state of the transistor is controlled in response to the presence detector output voltage which is supplied to the base of the transistor through a coupling resistor 112. Thus, whenever the ultrasonic presence detector produces an output voltage, transistor 110 is triggered into conduction. This effectively shunts resistor 106 with emitter resistor 11, thereby lowering the total unbypassed emitter circuit resistance of transistor 100 to effectively produce an increase in gain of tuned amplifier 18. When output voltage is no longer produced by the ultrasonic presence detector, transistor 110 again becomes nonconductive, thereby raising the unbypassed emitter circuit resistance of transistor 100 to effectively decrease the gain thereof.

In operation, each of the ØA pulses produced by multivibrator 10 triggers audio oscillator 12 into operation through gate 11. The ultrasonic signal generated by oscillator 12 is coupled through amplifier 13 and high-pass filter 14 to transmitting transducer 15, which responds by producing a compressional wave pulse of ultrasonic frequency within the atmosphere surrounding the transducer.

Subsequent to each ØA pulse, a ØB pulse is produced by multivibrator 10, triggering gate 24. The resultant pulse produced by gate 24 fulfills one input to coincidence detector 23 throughout the duration thereof. The time constants of multivibrator 10 constrain initiation of each ØB pulse to a predetermined time following initiation of the preceding ØA pulse. This predetermined time is of sufficient duration to permit reverberant vibrations of transmitting transducer 15, which continue after emission of an ultrasonic energy pulse, to die out before initiation of an output pulse by gate 24. The transmitted pulse is thus prevented from being coupled into the receiver circuitry while gate 24 is open, thereby avoiding false detections.

Initation of each ØB pulse opens gate 24, which in turn remains open for a predetermined time which represents the expected round-trip transit time through the atmosphere of a compressional wave pulse emitted by transmitting transducer 15 and reflected back by a vehicle or object to receiving transducer 16. Duration of the pulses produced by gate 24 may be made adjustable so as to compensate for various round-trip transit times which may be encountered due to differences in distance between the transducers and the vehicle or object to be detected.

Each pulse reflected by any reflecting surface, such as that of a vehicle or other object to be detected, or of pavement or other surface above or in front of which the vehicle or object is to pass, is received by receiving transducer 16, which produces an electrical impulse of ultrasonic frequency in response thereto. Each impulse is coupled through tuned amplifiers 17–19 to D.C. restorer 20 and signal detector and threshold level control 21. The D.C. restorer and the signal detector and threshold level control render the ultrasonic detector output voltage responsive only to vehicles or other objects to be detected, by supplying only those received signals of amplitude above a predetermined value to the other input of coincidence detector 23. These signals are herein designated receiver output pulses.

In the event the pulses received by receiving transducer 16 are reflected from background surfaces, such as a pavement surface, the round-trip transit time of each compressional wave pulse exceeds the interval extending from initiation of a sonic pulse to completion of the gate 24 pulse. Under these conditions, no output pulse is produced by coincidence detector 23. However, a vehicle or other object to be detected, upon entering the foreground, begins reflecting from the surfaces thereof. Moreover, since these surfaces are closer to the transducers than the background surfaces, round-trip transit time of each compressional wave pulse is diminished. The received pulse is thus supplied to coincidence detector 23 contemporaneously with a gate 24 pulse, resulting in an output pulse being supplied to storage circuit 25 from coincidence detector 23. Hence, the system interprets receipt of a reflected pulse contemporaneously with a generated gate 24 pulse as an indication that the received pulse has been reflected from a vehicle or object within the detection zone.

It will be noted that receiver delay circuitry 22 is so arranged as to require receipt of two consecutive receiver output pulses at times contemporaneous with receipt of two consecutive gate 24 pulses respectively, as a condition precedent to initiation of output voltage from the ultrasonic detector. The two consecutive receiver output pulses raise the voltage level of storage circuit 25 above the value to which level monitor 26 is preset. This condition is detected by the level monitor, which then renders output switch 27 conductive. In this fashion, an output voltage is produced by the ultrasonic presence detector in response to detection of a vehicle or object.

As long as compressional wave pulses reflected from the vehicle or object and received by transducer 16 continue to produce receiver output pulses contemporaneously with each of the gate 24 pulses, coincidence detector 23 maintains a continuous train of output pulses. Timer 28 is reset by each of the pulses, and therefore generates no output pulse of its own. However, if there is a sufficient time lapse between successive output pulses from coincidence detector 23, timer 28 produces an output pulse which renders output switch 27 nonconductive. Timer 28 is adjusted to produce an output pulse following a period in which reset pulses are absent for an interval of approximately twice the interval between consecutive transmitted pulses. This compensates for the delay in initial detection of a vehicle or object due to the required receipt of two consecutive pulses from coincidence detector 23 before an output is initiated from the detector.

When the ultrasonic presence detector initiates an output voltage in response to detection of a vehicle or object, gain control switch 29 functions to increase the gain of tuned amplifier 18. Hence, after two consecutive pulses have been reflected from a vehicle or object, the ultrasonic detector abruptly increases in sensitivity to received compressional wave pulses. Detection of very weak reflected pulses is thereby assured, preventing a condition sometimes referred to as "stutter." This condition is characterized by a discontinuous indication of detection for a single vehicle or object, and may arise whenever a vehicle or object passing beneath the transmitting transducer reflects compressional wave pulses to the receiving transducer with widely varying efficiency. The expanded gain introduced by gain control switch 29 assures that each detected vehicle or object, once detected, remains in detection for as long as it is within the detection zone. Once the vehicle or object leaves the detection zone, and sufficient time has elapsed since the latest output pulse from coincidence detector 23, timer 28 generates an output pulse which renders output switch 27 nonconductive. Output voltage from the ultrasonic detector thus ceases, and transistor 110 again becomes nonconductive, lowering the gain of tuned amplifier 18. A more detailed and comprehensive discussion of the problem of "stutter" and means for overcoming this problem within an ultrasonic detector may be obtained from John H. Auer, Jr., et al., application Ser. No. 384,292, filed July 22, 1964.

Figure 2:
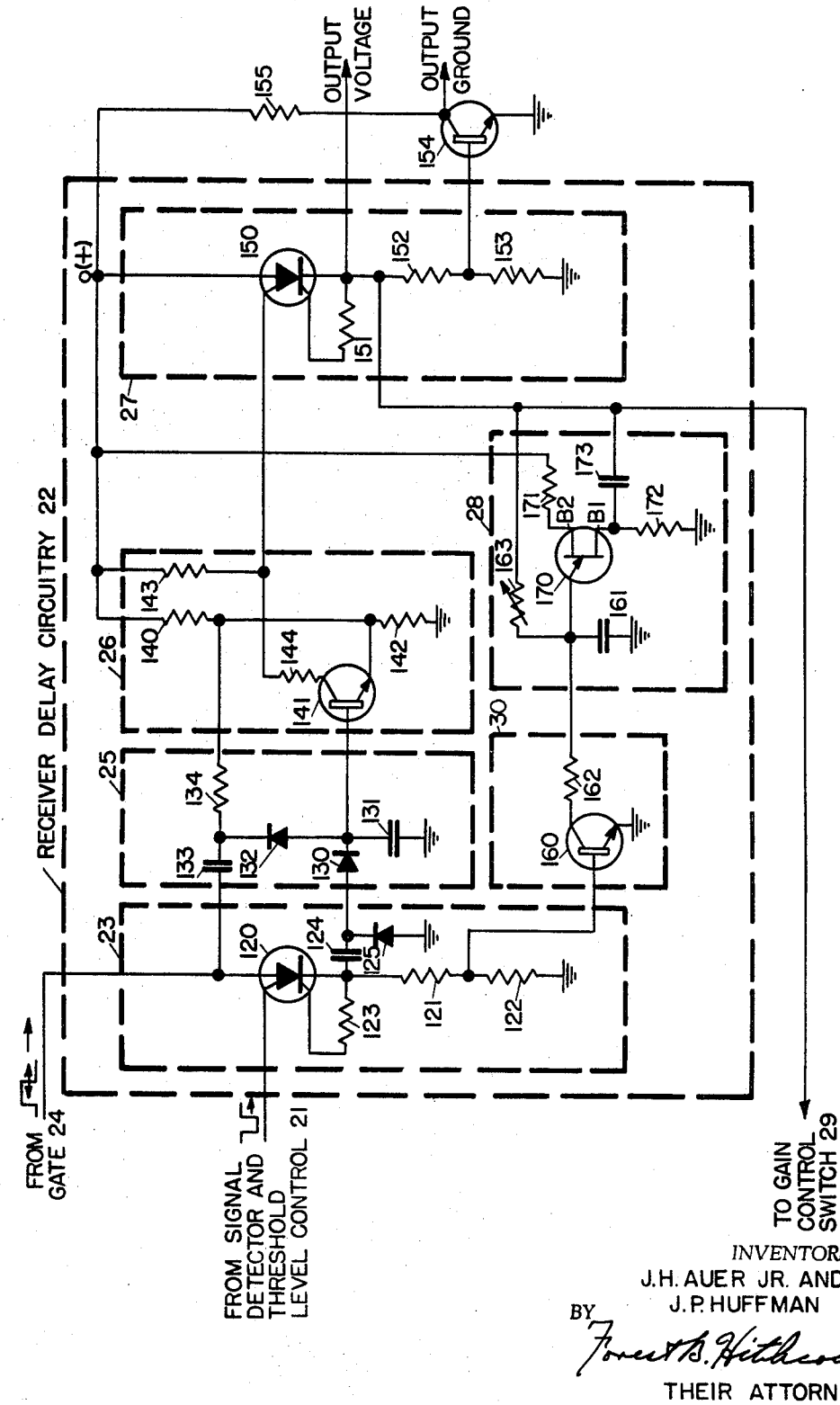
FIG. 2 is a schematic diagram of a portion of the receiver circuitry of FIG. 1 along with additional output circuitry.

FIG. 2 is a schematic diagram of receiver delay circuitry 22, with additional facility for providing a ground connection while a vehicle or object is detected. Coincidence detector 23 comprises a silicon controlled switch 120 receiving negative receiver output pulses from signal detector and threshold level control 21 at its anode and receiving gate pulses from gate 24 at its anode. Hereinafter, each silicon controlled switch is designated as SCS. The cathode of SCS 120 is coupled to ground through a pair of series-connected resistors 121 and 122. A resistor 123 couples the cathode gate to the cathode and facilitates stable SCS operation by maintaining the cathode gate substantially at cathode potential. The cathode of SCS 120 is coupled through a capacitor 124 to the cathode of a diode 125 having its anode grounded. Diode 125 clamps to ground the negative extremities of output pulses provided by coincidence detector 23.

Output pulses produced by coincidence detector 23 are coupled through a diode 130 to a capacitor 131. Capacitor 131 stores charge supplied thereto from the cathode of SCS 120 through capacitor 124. Diode 130 is poled so as to prevent discharge of capacitor 131 back to capacitor 124. Capacitor 131 is also coupled to one side of a capacitor 133 through a diode 132. The other side of capacitor 133 receives pulses from gate 24. Diode 132 is poled so as to prevent discharge of capacitor 133 into capacitor 131. In addition, positive bias is supplied to the cathode of diode 132 through a resistor 134. Resistor 134 in turn receives positive bias through a resistor 140 of level monitor circuit 26. Resistor 140 is coupled to ground through a resistor 142. Capacitor 133 is thus charged to a low voltage dependent upon the relative sizes of resistors 140 and 142 while gate 24 is closed, assuming no vehicle or object is detected by the presence detector. Each positive pulse supplied from gate 24 drives the left-hand plate of the capacitor positive above the level of positive voltage on the right-hand plate. Before completion of this pulse, the voltage on the right-hand plate of capacitor 133 is restored to the potential determined by the voltage divider comprising resistors 140 and 142. It should be noted that at this time, the polarity of voltage on capacitor 133 has been reversed. After completion of the pulse, the right-hand plate of capacitor 133 is again restored to the potential determined by resistors 140 and 142, and the voltage on capacitor 133 is restored to its original polarity.

When a voltage on capacitor 131, acquired under conditions described infra, exceeds that at the junction of capacitor 133 and resistor 134, diode 132 is forward biased. This conditon may occur only during the interval between consecutive pulses produced by gate 24. During each such interval, therefore, capacitor 131 transfers charge to capacitor 133. It should be noted that the capacitance value of capacitor 131 is considerably greater than that of capacitor 133, as to enable capacitor 133 to acquire a charge during each such interval, without fully discharging capacitor 131 in this interval. However, these values are also selected to assure that after the third consecutive pulse produced by gate 24 in the absence of contemporaneous receiver output pulses produced by the signal detector and threshold level control, the voltage level on capacitor 131 will be restored substantially to ground potential.

Voltage stored on capacitor 131 is applied to the base of a transistor 141 of level monitor circuit 26. Emitter bias is supplied to transistor 141 from a voltage divider comprising resistor 140 and a resistor 142. Collector bias for transistor 141 is supplied through a pair of series-connected resistors 143 and 144. The collector of transistor 141 is coupled through resistor 144 to output switch 27 which comprises a silicon controlled switch 150. Signals from transistor 141, which serve to render the output switch conductive are thus applied to the anode gate of SCS 150. Resistors 143 and 144 function as a voltage divider network for maintaining the anode gate voltage on SCS 150 within proper amplitude limits.

The cathode gate of SCS 150 is coupled to the cathode thereof through a stablizing resistor 151, which performs a function similar to that of resistor 123. The cathode of SCS 150 is connected to ground through a pair of series-connected resistors 152 and 153. Output signals from the cathode of SCS 150 comprise the output voltage signal of the ultrasonic presence detector. In order to provide a ground indication only during presence of a vehicle or object within the detection zone, a transistor 154 is provided having its base directly connected to the junction between resistors 152 and 153, and its emitter grounded. The collector of transistor 154, which receives positive bias through a resistor 155, thus provides the aforementioned ground indication when rendered conductive. In addition, cathode voltage of SCS 150 is supplied to gain control switch 29.

Timer reset circuit 30 comprises a transistor 160 having its base directly connected to the junction between resistors 121 and 122 of coincidence detector 23, and its emitter grounded. The collector of transistor 160 is coupled to one side of a capacitor 161 in timer 28 through a resistor 162 of relatively low ohmic value. The other side of capacitor 161 is grounded. A resistor 163, which may be variable, couples the cathode of SCS 150 to the junction of capacitor 161 and resistor 162 for the purpose of allowing timer 28 to be activated only when SCS 150 is in conduction. The RC time constant of capacitor 161 and resistor 163 controls the amount of time delay of timer 28.

The junction of resistor 162 and capacitor 161 is connected to the emitter of a unijunction transistor 170 of timer 28. Base B2 of unijunction transistor 170 receives positive bias through a resistor 171, while base B1 is coupled to ground through a biasing resistor 172. In addition, base B1 is coupled to the cathode of SCS 150 in output switch 27 through a coupling capacitor 173.

If it is assumed that no vehicle or object is present within the detection zone, pulses received by SCS 120 from gate 24 and from signal detector and threshold level control 21 are uncontemporaneous; that is, for SCS 120 to become conductive, positive energy on the anode is required simultaneously with negative energy on the anode gate. However, with no vehicle or object within the detection zone, pulses received by the receiving transducer are reflected only from a background, such as pavement in the case of a vehicle. Because of the lengthy round-trip transit time of pulses from the transmitting transducer to the background surface and back to the receiving transducer, the negative pulse produced by signal detector and threshold level control 21 is received subsequent to completion of the positive pulse from gate 24. Therefore, SCS 120 remains nonconductive, capacitor 131 receives no charge, transistor 141 remains nonconductive and SCS 150 remains nonconductive. Thus, no output voltage is supplied from the cathode of SCS 150, and no voltage is supplied to gain control switch 29. In addition, transistor 154 remains nonconductive.

When a vehicle or object enters the detection zone, the round-trip transit time of compressional wave pulses is decreased to the point where pulses are received by SCS 120 coincidentally from gate 24 and from signal detector and threshold level control 21. The first set of coincidental pulses on the anode and anode gate of SCS 120 triggers the SCS into conduction. This produces a positive voltage at the cathode of the SCS, causing current flow through capacitor 124, diode 130 and capacitor 131 in series. Due to low resistance of the conducting path through SCS 120, capacitor 131 is rapidly charged to a voltage determined by the voltage on the cathode of SCS 120 and the capacitance values of capacitors 124 and 131. However, the voltage which appears across capacitor 131 due to receipt of a single pair of contemporaneous pulses by coincidence detector 23 is insufficient to drive transistor 141 into conduction, due to the relative values of capacitor 124 and capacitor 131. Thus, SCS 150 remains nonconductive, and capacitor 161 remains uncharged since substantially no voltage is supplied thereto through resistor 163. Hence, unijunction transistor 170 remains nonconductive, as does transistor 160.

In the event each pulse produced by signal detector and threshold level control 21 is initiated subsequent to initiation but prior to completion of each pulse respectively produced by gate 24, SCS 120 similarly receives coincidental pulses. In this case, however, the anode of SCS 120 is first driven positive by the gate pulse in the absence of the signal detector and threshold level control pulse. The voltage on capacitor 133 thus reverses polarity, in the manner previously described. Upon subsequent occurrence of the signal detector and threshold level control pulse, SCS 120 is driven into conduction, causing a drop in anode potential due to current flow through resistance in the circuit of gate 24. This results in lowered potential at the junction of capacitor 133 and resistor 134 occurring coincidentally with the instant at which capacitor 131 begins to charge. The net result of this condition is that capacitor 133 draws a small amount of charges from capacitor 131 prior to completion of the pulse from gate 24. The amount of charge withdrawn from capacitor 131 in this manner, however, is insufficient to delay initiation of a vehicle or object detection indication beyond the time required for receipt of the requisite two consecutive reflected pulses.

After completion of the first set of coincidental pulses received by coincidence detector 23, SCS 120 again becomes nonconductive. Transistor 160 thus becomes nonconductive. In addition, charge stored on capacitor 124 produced by current which charged capacitor 131 leaks off to ground through resistors 121 and 122 in series. Moreover, if the amplitude of voltage on capacitor 131 exceeds that on capacitor 133, a small portion of the charge on capacitor 131 leaks off through diode 132 to capacitor 133. It should be noted that the voltage maintained at the junction of resistor 134 and capacitor 133 is below the base voltage required to drive transistor 141 into conduction, in order to permit transistor 141 to become nonconductive when desired.

If it be assumed that the first pair of pulses received contemporaneously at coincidence detector 23 was due to a malfunction such as stray noise pickup, without any vehicle or object being within the detection zone, subsequent pulses from gate 24 and from signal detector and threshold level control 21 are received uncontemporaneously. Thus, each positive pulse supplied to the anode of SCS 120 causes capacitor 133 to reverse the polarity of its charge in a manner previously described. Upon completion of the pulse from gate 24, the charge on capacitor 133 restores to its original polarity by receiving charge from both capacitor 131 and the voltage divider comprised of resistors 140 and 142. This process continues, in absence of detection of a vehicle or object, until diode 132 is no longer forward biased when the anode of SCS 120 receives a positive pulse. At this juncture, capacitor 131 is substantially fully discharged. The rate at which capacitor 131 is discharged depends upon the capacitance ratio of capacitor 131 to capacitor 133.

If it be assumed that a first pair of contemporaneous pulses has been received by coincidence detector 23, due to presence of a vehicle or object within the detection zone, the second pair of contemporaneous pulses received consecutively without interjection of any noncontemporaneous pulses again drives SCS 120 into conduction. Capacitor 131 now receives additional charge through capacitor 124 from the cathode of SCS 120. At this time, due to the increased amount of charge on capacitor 131, the voltage thereon is of sufficient amplitude to drive transistor 141 into conduction. The voltage drop across resistor 143 due to collector current flow through transistor 141 thus triggers SCS 150 into conduction, producing a positive output voltage at the cathode thereof. This, in turn, drives the base of transistor 154 positive, so that ground potential may now be observed at the collector thereof. Moreover, coincidence detector 23 also drives transistor 160 into conduction, due to the positive voltage supplied to the collector of transistor 160 from the cathode of SCS 150 through resistors 163 and 162 in series. During each conduction interval of transistor 160, a low resistance path in shunt with capacitor 161 is provided by resistor 162 in series with the transistor, thereby preventing a voltage buildup on the capacitor of sufficient amplitude to trigger unijunction transistor 170 into conduction.

Each subsequent consecutive pair of contemporaneous pulses received by coincidence detector 23 without interjection of any noncontemporaneous pulses momentarily drives SCS 120 into conduction, in turn momentarily driving transistor 160 into conduction. Thus, the voltage on capacitor 161 supplied thereto through resistor 163 is maintained below the firing potential of unijunction transistor 170, due to regular recurrence of the low resistance path comprising the series connection of resistor 162 and transistor 160 in shunt with capacitor 161 in unison with the regularly-occurring conduction intervals of SCS 120.

After the detected vehicle or object leaves the detection zone, pulses received by coincidence detector 23 are once again noncontemporaneous, due to the increased round-trip transit time of the compressional wave pulses. As previously described, each pulse supplied from gate 24 causes capacitor 133 to withdraw a predetermined proportion of the charge remaining on capacitor 131. Capacitors 131 and 133 are preferably chosen so that three consecutive pulses from gate 24 supplied to the anode of SCS 120 uncontemporaneously with pulses from signal detector and threshold level control 21 are sufficient to lower the voltage on capacitor 131 to approximately ground potential. Transistor 141 is thus driven out of conduction, resulting in cessation of collector current through resistor 143. However, the resultant positive increase in voltage on the anode gate of SCS 150 does not drive the SCS out of conduction. Hence, output voltage continues to be produced from the ultrasonic presence detector, and ground potential remains on the collector of transistor 154. However, since SCS 120 is no longer driven into conduction, transistor 160 remains out of conduction. Thus, a low resistance path is no longer regularly shunted around capacitor 161, permitting the capacitor to charge through resistor 163 to a value which ultimately fires unijunction transistor 170. The RC time constant of resistor 163 and capacitor 161 is preferably chosen so as to require that an interval approximately equal to the interval extending from the first to the third of three consecutive pulses produced by gate 24 elapse before the voltage stored on capacitor 161 reaches the firing potential of unijunction transistor 170. This time constant may be readily adjusted by varying the size of restistor 163. By delaying completion of output voltage from the ultrasonic presence detector until at least two consecutive pulses are received at the anode of SCS 120 uncontemporaneously with pulses received at the anode gate of SCS 120, loss of one reflected pulse from a vehicle or object within the detection zone cannot produce erroneous completion of this output voltage.

When the voltage on capacitor 161 reaches the firing potential of unijunction transistor 170, capacitor 161 is discharged through the emitter and base B1 of the unijunction transistor, causing an abrupt increase in voltage across resistor 172. This abrupt increase in base B1 voltage is coupled to the cathode of SCS 150 through capacitor 173, and is of such magnitude as to reverse the anode-to-cathode voltage of SCS 150, rendering the SCS nonconductive. Output voltage produced by the ultrasonic presence detector thus drops to zero. In addition, gain control switch 29 no longer receives positive voltage, and the gain of tuned amplifier stage 18, shown in FIG. 1, is decreased to the lower of its two values. Further, because current flow through resistor 153 ceases, transistor 154 becomes nonconductive, and ground potential no longer exists at the collector of transistor 154.

A prerequisite to proper ultrasonic presence detector operation here is that a predetermined number of consecutive pulses, such as two, must be supplied from gate 24, once a vehicle or object has been detected within the detection zone, prior to appearance of an output voltage from the ultrasonic detector. This delay at the outset of detection is compensated by a corresponding delay at completion of detection which is introduced by the RC time constant of resistor 163 and capacitor 161, as already described.

Figure 4:
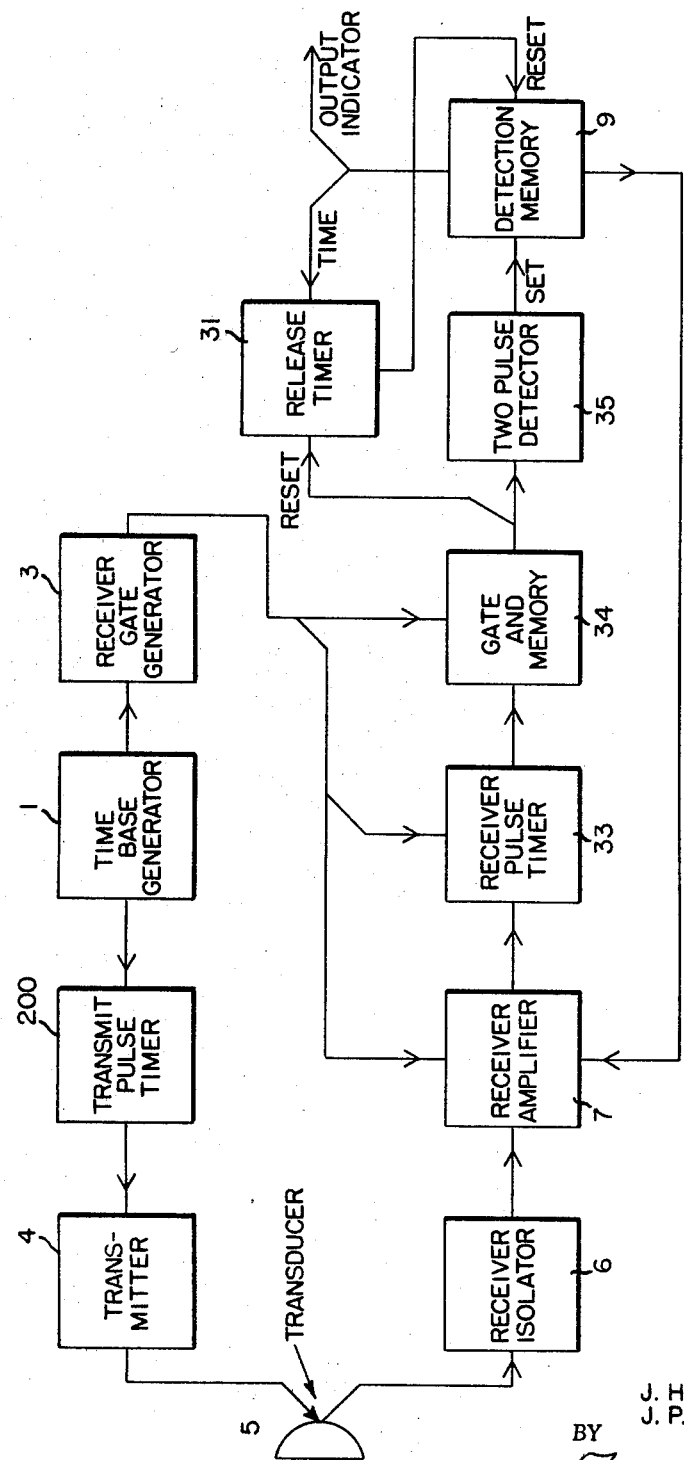
FIG. 4 is a functional block diagram of a detector system using both a unique time duration and two successive pulse requirement for recognition and detection of vehicle presence.

FIG. 4 shows a system embodiment, containing both pulse recognition and plural pulse detection, wherein a time base generator 1, comprising any suitable free running oscillator of required repetition rate, creates repetitive pulses used to key the transmission of sonic energy and receiver gate signals. The time base generator 1 output is conducted to the transmit pulse timer 200, which apparatus provides a pulse output of approximately five millisecond duration to drive transmitter 4. The transmitter output, a substantially monotonic energy pulse of five millisecond duration, supplies power to the sonic transducer 5. The sonic transducer 5, through electro-mechanical conversion, directs compressional wave front signals, commensurate to the frequency of the transmitter signal, to intercept the predetermined path of moving vehicles or objects.

The time base generator output 1 determines the repetition rate of receiver gate signals by triggering the receiver gate generator 3. In response to each pulse from the time base generator 1, the receiver gate generator 3 produces an output signal of sufficient duration so as to encompass an interval of time commencing shortly after the cessation of transducer 5 transmission and ending at or shortly after the time required for acquisition of the sonic energy reflected from the pavement. If the system is used where no pavement reflection exists, then a different time may be selected. The receiver gate generator 3 output is utilized by various parts of the system, viz., the receiver amplifier 7, receiver pulse timer 33, and gate and memory 34, in the recognition of reflected vehicle signals.

The sonic transducer 5 in addition to being capable of converting electrical energy into mechanical motion, is also sensitive to the receipt of pressure variations. Pressure variations are caused by ambient noise conditions present in the environment of the transducer and energy reflections in response to its own transmitted pulses. Thus, as a transmitted sonic pulse is reflected either from the roadway or a passing vehicle, it is sensed by the transducer 5 and results in generation of a voltage output. The voltage output is coupled to the receiving portion of the system through receiver isolator 6 which allows the receiver portion of the system to sense reflected signals while rejecting excessively large signals produced when voltage or power is supplied to the transducer 5. Also prevented is the loading of the transmitter 4 during pulse transmission periods and the transducer 5 during energy reflection periods.

Output from the receiver isolator 6 is conducted to the receiver amplifier 7. The amplifier is tuned to the tonal frequency of the transmitter-transducer combination and is relatively unresponsive to any received signals not primarily containing that single basic frequency; this results in rejection of a certain amount of noise received from environmental effects on the transducer itself. The receiver amplifier 7 is rendered responsive by the receiver gate generator 3 signal, thus avoiding responding to energy pulses indicative of transmitted rather than reflected signals.

The received signals of specified tonal frequency after amplification are received by the receiver pulse timer 33, which is arranged to produce a signal output upon its recognition of pulses having a time duration in excess of three milliseconds. Further, the received pulses of required duration must be coincident with the gate signal provided by receiver gate generator 3. If these two conditions are met, a signal output lasting for the remaining duration of the gate signal period is produced by the gate and memory unit 34.

The gate and memory unit 34 is only enabled during the gate period provided by receiver gate generator 3. Its memory feature is provided by the bistable character of its circuitry; once energized during the gate interval, it can only be deenergized upon cessation of the gate signal. Thus, the receipt of reflected signals during the gating period produce only a single output from the gate and memory unit 34.

The two pulse detector unit 35 is actuated if more than a single output signal is derived from the gate and memory unit 34 during a predetermined span of time. This interval is selected to encompass one or more energy transmission cycles, a single cycle consisting of the time between successive transmissions of energy from the sonic transducer 5 as determined by the time base generator 1.

System parameters are chosen to demand two received pulses before producing an output from the two pulse detector 35 to indicate the presence of a passing vehicle or object and this condition ultimately dictates the cycle time of the system dependent upon the transducer 5 coverage and the maximum speed of the vehicles.

The two pulse detector 35 output then effects a change of state in the detection memory unit 9. Once the detection memory unit 9 is altered, it remains so until output signals from the gate and memory unit 34 cease for longer than a certain maximum period. The desired period, before resetting of the detection memory unit 9, is determined by specified operational requirements and implemented by a release timer unit 31. The release timer unit 31 starts to time out whenever a signal is produced by the detection memory unit 9 and is reset to start upon each receipt of an output signal from the gate and memory unit 34. Thus, as long as signals are being received from the gate and memory unit 34 at a certain minimum rate, the release timer unit 31 is not permitted to time out. At such time as these signals cease for a period commensurate with the minimum rate the release timer 31 goes through its time cycle and produces an output signal which in turn resets or clears the detection memory unit 9.

The various advantages and improved operational features of the system of FIG. 4 are exemplified and more clearly explained in FIGS. 5 through 8 and the following paragraphs. The same numbers are used in FIGS. 4 through 8 to indicate the same parts and subsystems performing the same functions.

RECEIVER ISOLATOR

Figure 5A:
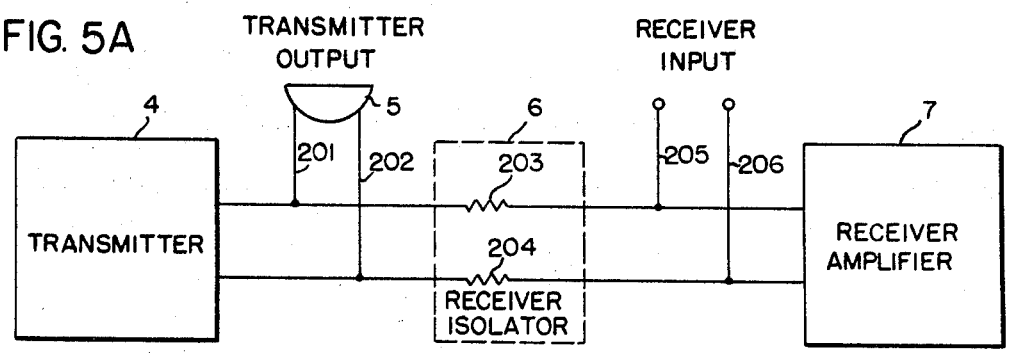
FIG. 5A represents one form of the receiver isolator shown in FIG. 4.

The receiver isolator 6 of FIG. 5A consists of two resistors each disposed between the transmitter 4 and the receiver amplifier 7. Resistors 203 and 204 comprise this linking network and are used whenever a single transducer system is employed for both sending and receiving sonic pulses. Lines 201 and 202 extend between the transducer 5 and the transmitter 4, lines 205 and 206 are only used in a two transducer application. If two transducers are used in the system, i.e. a separate sending and separate receiving transducer, there is no necessity for a receiver isolator unit 6. Since, however, the preferred embodiment of this invention visualizes its use in a single transducer system, then the use of coupling networks will be considered throughout. With a single transducer, resistors 203 and 204 provide isolation which allows the transmitted pulse to be applied to the same transducer which is being used for receiving. During transmission most of the power is delivered to the transducer 5 since resistors 203 and 204 are of greater value than the transducer 5 input impedance. Received signals, however, are substantially attenuated by resistors 203 and 204 before application to the receiver amplifier 7.

Figure 5B:
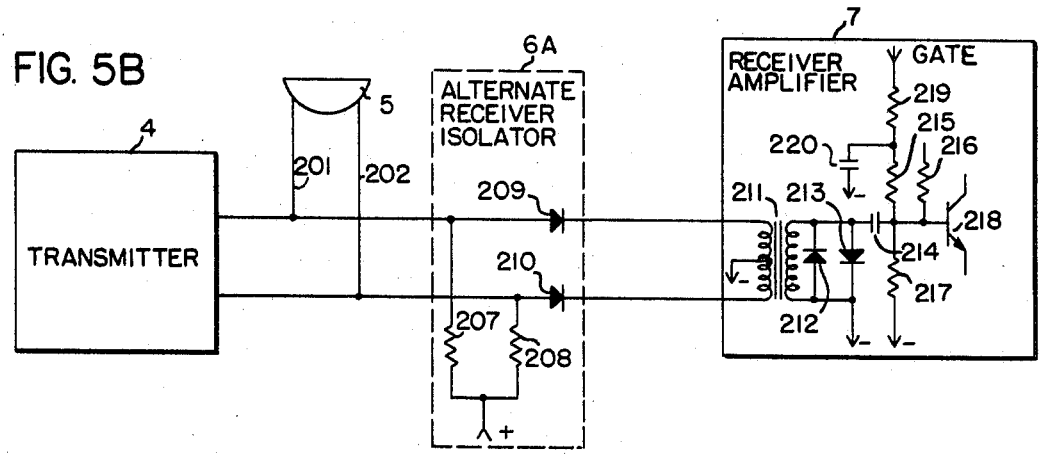
FIG. 5B shows an alternate form for the receiver isolator of FIG. 4 and a portion of the receiver amplifier circuitry.

FIG. 5B shows an alternate configuration which may be used in place of the coupling resistors 203 and 204. This alternate scheme substantially disconnects the transmitter 4 output terminals from the receiver amplifier 7 during the transmitting periods while these same output terminals connect to the receiver amplifier 7 during the receiving interval. This results in improved performance in two ways. First, the transmitter 4 output signal is increased by the reduction of the receiver amplifier 7 loading, and second, the large attenuation of the received signal by resistors 203 and 204 is for all practical purposes eliminated.

Referring to the detailed circuit illustration of FIG. 5B the alternate coupling configuration 6A is shown. In this configuration diodes 209 and 210 carry a forward bias current hereinafter referred to as $I_b$. This current is supplied by a DC voltage source $E_b$ impressed between the junction of equal valued resistors 207 and 208 and the primary center tap of transformer 211. The value of resistors 207 and 208 is designated by R. For analysis purposes it will be assumed that the impedance of the primary winding of transformer 211, $R_p$, is entirely resistive and equal to the DC resistance of the winding. Although this assumption is obviously not true it is sufficiently close so as to lend substantial simplification to the analysis while not creating any significant error. The signal generated by the transmitter 4, $E_s$, creates a current $I_s$ flowing through the transmitter 4, the diodes 209 and 210 and the primary of transformer 211. This current of alternating character, creates a current flow of first one polarity and then the opposite. However, since the circuit response is the same for either polarity, consideration of only one-half a cycle will be given.

During this half cycle the resultant current, $I_d$, through diode 209 is equal to the sum of the bias current and the signal current, while the resultant current through the diode 210 is equal to the difference between the bias current and the signal current. Until the signal current increases to a value equal to the bias current the resultant current in both diodes is in the forward direction and both behave as closed or shorted switches.

Within this operating region the parameter M which is defined as follows:

$$M = \frac{E_s/R_p}{E_b / \left( R + \frac{R_p}{2} \right)}$$

is equal to the ratio of the signal current to the bias current. Thus when M is equal to or less than one, the ratio of the current through diode 210 to the bias current is equal to $1-M$ and the ratio of current through diode 209 to the bais current is equal to $1+M$. When the signal current becomes equal to the bias current the composite current through diode 210 is reduced to zero and that through diode 209 is doubled. Any further increase in the level of the signal voltage results in diode 210 becoming a completely open switch and the current through diode 210 remains zero while current through diode 209 increases more slowly. These current relationships are exhibited in FIG. 5C.

For M greater than one the rate of increase of current $I_d$, through diode 209 with signal voltage increase, is a function of the ratio of resistor 208 or resistor 207 (both being of equal value) to half the DC resistance of the primary winding of transformer 211. This is shown by the following expression:

$$\frac{I_d}{I_b} = 2 + \frac{2}{2 + \frac{R}{R_p/2}} [M-1]$$

Figure 5C:
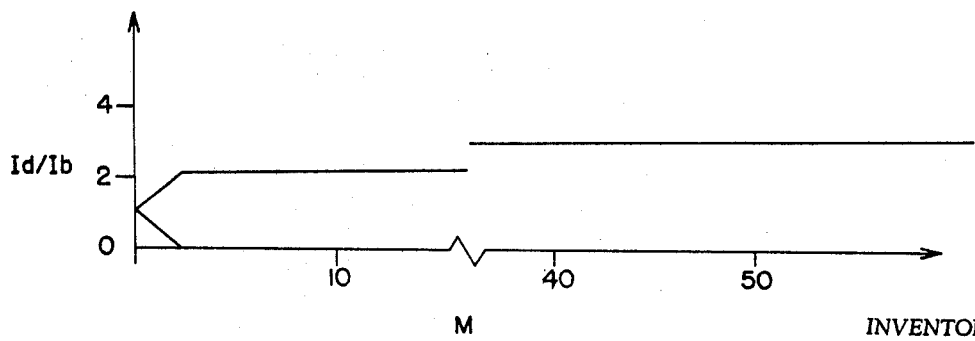
FIG. 5C is an explanatory graph illustrating the operation of the circuit receiver isolator contained in FIG. 5B.

For example, if that ratio is equal to 100 the relationship between the ratio of diode current to bias current and M is as shown on the previously referred to graph of FIG. 5C. Note that the current through diode 210 is reduced to zero when M becomes equal to one, whereas the current through diode 209 doubles. Note also, that for the current through diode 209 to be increased to a value of three times the bias current, a value of M of 51 is required. Therefore, it is obvious that the receiver amplifier 7 is essentially disconnected from the transmitter 4 when large ratios of resistor 208 or 207 to one-half the DC resistance of the primary winding of transformer 211 are utilized.

Resistors 207 and 208 may be of relatively large value since they are required only to provide sufficient bias current to allow the weak received signals from the transducer 5 to be passed to the receiver amplifier 7. To recapitulate, large value transmitted signals producing greater signal current than the magnitude of the initial bias current result in essentially disconnecting the receiver amplifier 7 from transmitter 4. While those relatively small signals derived from the transducer 5 in response to reflected pulses, produce signal currents through the diodes of substantially lower value than the bias current magnitude and are conducted to the receiver amplifier 7 with little or no attenuation.

TEMPERATURE COMPENSATION

The receiver gate generators 3 produces pulses of approximately twenty millisecond duration under normal usage conditions, i.e., with transducers mounted approximately eighteen feet above the roadway. In this position, a gating interval of approximately twenty milliseconds is sufficient to encompass any vehicle signal reflections occurring between pulse transmission and roadway surface reflection. The time base generator 1 establishes timing pulses in normal usage with approximately a one hundred millisecond period. Each occurrence of such a time base pulse initiates a gate signal from the receiver gate generator 3. During actual operation it is found that the variation in the velocity of sound through air introduced by changes in temperatures results in a serious error. FIG. 6B demonstrates by its dotted line curves the transit time for a transmitted pulse reflected from the roadway surface as a function of ambient temperature. From these curves it is obvious that a detector system properly adjusted at one temperature may be incorrectly calibrated when a large ambient temperature change occurs. For example, in an overhead system the gate interval is normally established so that the roadway or pavement reflection is substantially excluded from the gating interval. If this adjustment were performed during cold ambient conditions the detector may very well respond to pavement reflections when the air becomes warmer. This is illustrated by the graph of FIG. 6B which shows that the pavement reflection, under warm weather conditions, may be received substantially sooner after initiation of the transmitted pulse. If this occurred, a continuous indication of vehicle presence would be given in the absence of any vehicles.

Figure 6A:
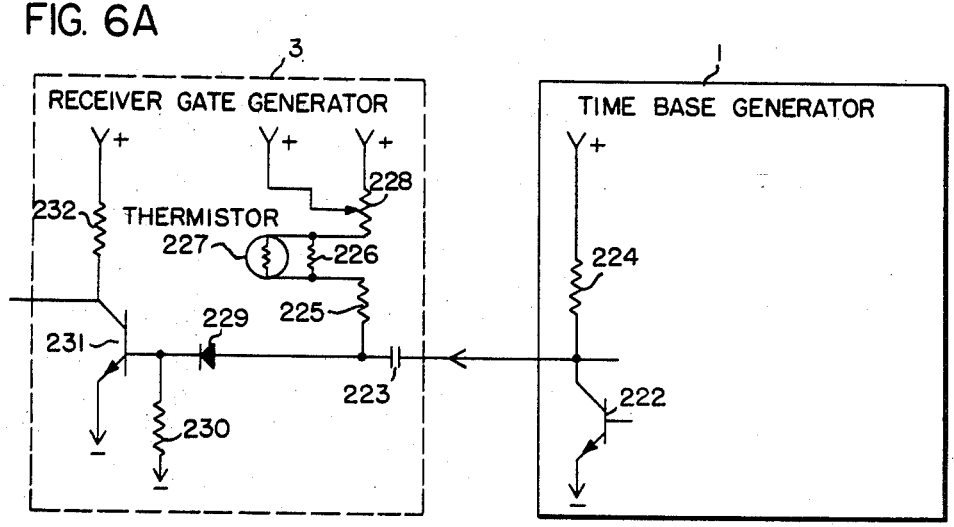
FIG. 6A is a schematic diagram of the temperature compensation employed in the receiver gate generator of FIG. 4.
Figure 6B:
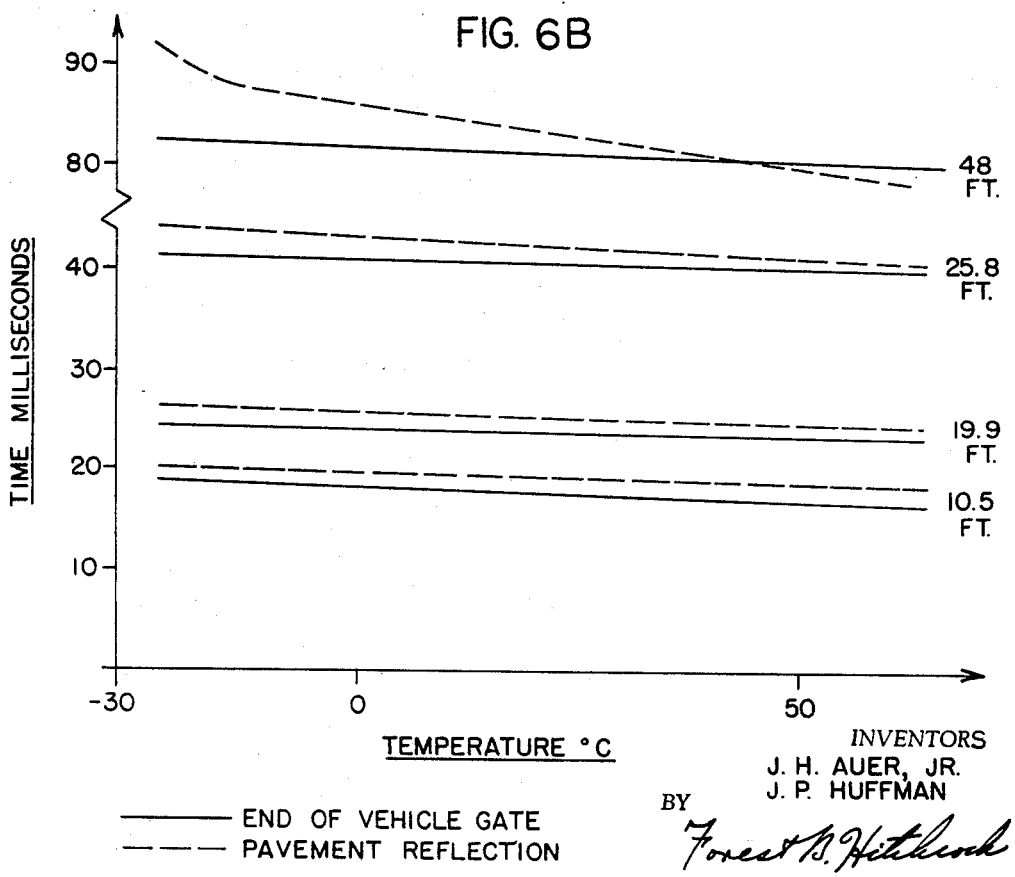
FIG. 6B is a graphic representation showing the effects of temperature upon roadway signal transit time and the adjustment of the gate interval.

To reduce and overcome this effect, a temperature compensating circuit is shown in the circuit description of FIG. 6A for the receiver gate generator 3. A thermistor 227 and parallel resistor 226 combination is added in series with resistors 228 and 225. This effects a variation in the length of vehicle gate commensurate with changes in temperature. The solid lines of FIG. 6B indicate the variation of the end of the gate pulse with temperature for a circuit compensated as shown in FIG. 6A. In the absence of such compensation the solid lines of FIG. 6B would be horizontal and would result, upon the reaching of a critical temperature, in the false indication of vehicle presence.

The graph also points out that excellent compensation is obtained in the range of ten to twenty feet and since this is the range of normal interest, the compensation is adequate for present and anticipated system requirements. Although relatively poor compensation is obtained at greater distances such as forty feet this is not of serious import since these long ranges are used in side fire applications where there is essentially no pavement signal reflection.

The ability to provide this type of compensation is inherent in the use of transistorized circuitry which does not generate any substantial amount of heat within itself and consequently the temperature within the unit is much closer to that of ambient than would be the case in vacuum tube circuitry. With a vacuum tube unit this type of compensation would have to be applied outside the structure of the receiver gate generator unit 3.

From the foregoing explanation of temperature compensation and the illustrated graph of FIG. 6B, it is evident that the system of this invention will operate properly under wide variances of ambient temperature for a range of normal operating detection distances. It accomplishes this by shortening the interval between initiation of the gating signal and its cessation as ambient temperature increases. Thus, even though the pavement transit time is less at high temperatures the gate end is continuously drawn back, thereby preventing its coincidence with a reflected pavement signal which would result in indicating vehicle presence.

Referring once again to FIG. 6A the temperature compensation accomplishes its purpose in the following detailed manner: The receiver gate generator unit 3, output transistor 231 is normally conductive and an output taken off its collector is zero or close to zero potential. When transistor 222 of the time base generator 1 conducts, it results in a negative going signal being applied to capacitor 223. Since the voltage across the capacitor cannot change instantaneously, this negative going signal appears at the junction of resistor 225 and diode 229 resulting in the removal of positive bias from transistor 231 and shutting transistor 231 off. As this transistor shuts off its collector voltage goes to a value of approximately the collector supply voltage, in this particular embodiment being approximately twenty-four volts. With the circuit in this state, capacitor 223 commences to charge through resistors 228, 226 in parallel with thermistor 227, and resistor 225. This combination of resistance and capacitance has a relatively large time constant and allows the voltage appearing at the junction of diode 229 and resistor 225 to rise slowly from a negative potential to a value sufficient to cause conduction of transistor 231, resulting in the removal of voltage at the collector of transistor 231 and end of the gate signal. It is apparent that the time between establishing a gate voltage and the removal of the gate voltage is determined by the time constant previously mentioned. Since the thermistor 227 and resistor 226 parallel combination form a part of this time constant, obviously any change in the resistance of this combination will result in changing the duration time of the gate signal, i.e. as the temperature goes up the thermistor 227 resistance goes down and hence the time constant goes down causing transistor 231 to be turned on at an earlier time. Conversely, as the temperature is reduced the thermistor 227 resistance increases and cutoff time of transistor 231 is increased commensurately. Resistor 228 is variable to permit calibration of the system.

GAIN CONTROL

With regard to the receiver portion of the system, amplifier 7 contains circuitry of particular importance. FIG. 5B shows the front end of the receiver amplifier 7 containing coupling transformer 211, diodes 212 and 213, each arrayed in opposite polarity across the secondary winding of transformer 211, coupling capacitor 214, bias and feedback resistances 219, 215, 217 and 216 for a transistor 218, and lastly a timing capacitor 220. The diodes 212 and 213 limit the magnitude of voltage signals applied to the receiver amplifier 7 while not affecting low amplitude signals relative to reflected vehicle detection signals. The remainder of the circuitry is directed to a critical problem associated with systems using a single transducer for both transmitting and receiving, i.e., ringing. Sonic transducers must have sufficient compliance to transmit sonic signals. This compliance allows the transducer to continue to move or ring for some short time after completion of pulse transmission. Ringing produces an output voltage from the transducer 5 which appears to the receiver equipment as a reflected signal. To prevent this ringing signal from indicating the presence of a vehicle, the application of the enabling gate signal to the receiver amplifier 7 is delayed for a short time necessary to allow the transducer 5 to damp out. If this delay is increased to an interval sufficient to eliminate the possibility of any false indications it results in a probability that actual vehicle detection signals received from vehicles travelling close to the transducer 5 will be missed by the gating period. To prevent this, a combination of minimum gate delay and receiver amplifier 7 gain control is utilized.

Capacitor 220 and series resistor 219, 215 and 217 in combination, achieve this control. The transistor 218 of the receiver amplifier 7 cannot conduct until the gate signal is applied to resistor 219 thereby establishing a bias level sufficient to allow transistor operation. The capacitor 220, however, prevents the voltage at the base of transistor 218 from rapidly increasing. Thus, for a period determined by the time constant of resistor 219 and capacitor 220, the gain of the receiver amplifier 7 is controlled so as to increase exponentially from approximately zero to its normal operating point after capacitor 220 is completely charged. This gain control prevents weak signals resulting from ringing of the transducer 5 from initiating vehicle indication, while still allowing those strong reflected signals from vehicles to initiate indication when occurring at the beginning of the gate period. The receiver amplifier 7 is then very sensitive at the latter part of the gate period enabling it to respond to weak vehicle reflections received from distant vehicles located at the edge of its detection zone.

PULSE RECOGNITION

Perhaps the most important feature of the present invention comprises its ability to respond only to actual vehicle signals while rejecting similar transient noise signals from various sources. In actual field use this problem is particularly severe in that the transistorized or solid state receiver equipment is small enough to be located within the controller cabinet where generated and picked up noise has its highest magnitudes. Some degree of immunity to this noise presence is obtained by the use of tuning in the receiver amplifier 7, however, this has been found in actual practice to be insufficient for providing complete immunity to noise transients. In other words, the noise present during operation of the system possesses a frequency spectrum containing a high proportion of energy within the band of the transmitted tonal frequencies.

This invention provides a large degree of immunity to these noise transients which allows the system to operate entirely satisfactorily under actual field conditions. The transmit timerpulse 200 gives transmitted pulses a unique character so that the receiver equipment may recognize them and differentiate between legitimate signal reflections and generated noise pulses. In the embodiment under consideration this is achieved simply by generating a relatively long time duration pulse and allowing the receiver equipment to respond only to those received signals of a significant and correlative duration. Since noise pulses are normally found to be of short duration they are rejected.

Referring to FIGS. 7A and 7B the actual circuitry of the received pulse timer 33 and transmit pulse timer 200 are shown, which units allow the system to distinguish the reflected signals from the noise transients.

FIG. 7A shows the transmit pulse timer 200 circuitry establishing the long duration signal, controlling the transmitter 4 pulse duration. Inspection of this circuit indicates that during a non-transmitting period transistor 280 of the time base generator 1 is off and capacitor 273 is charged in accordance with the voltage across it. When transistor 280 is switched on, its collector goes from its relatively high level toward zero. This results in this negatively going signal appearing at the junction of resistor 274 and diode 275 resulting in the cutting off of transistor 278 by the removal of the positive bias on its base. The shut-off of transistor 278 is prevented from happening in a very rapid fashion by the time constant supplied by capacitor 276 and resistor 277 located between its base and common. Due to this time constant a sharp wave front signal cannot appear at the collector of transistor 278, thereby preventing the application of sharp wave front energy to the transducer 5 which would result in impulsing the transducer 5 upon initial energization. Capacitor 273 then proceeds to charge through resistor 274 and transistor 280. After a selected period, in practice approximately five milliseconds, the voltage appearing at the junction of resistor 274 and capacitor 273 is sufficiently high to cause conduction through transistor 278. This ends the gate signal on the collector of transistor 278 and output from the transmitter 4. The transmitter 4 is arranged so as to produce output energy whenever transistor 278 is turned off.

Recognition of pulses having correlative time attributes of the transmitted pulses is mainly accomplished by the receiver pulse timer unit 33 which circuitry is also shown in FIG. 7B. This circuit is tailored to respond to signals equal to or greater than three millisecond duration; rejecting those signals of less than three millisecond duration.

The received signal from the receiver amplifier 7 is conducted to the base of transistor 239 through capacitor 233 and variable resistor 235. Series resistor combination 234 and 235 and resistor 240 establish the operating level of transistor 239 in conjunction with feedback resistor 236. Resistor 237 provides the collector load for transistor 239 and capacitor 241 is a bypass capacitor for the emitter resistor 240. Transistor 239 with its associated circuitry amplifies signals from the receiver amplifier 7. The output of this stage is coupled through capacitor 238 to Zener diode 242.

Typical wave forms for received signals at point A are shown in FIG. 7C. The first depicted wave form represents a transmitted pulse, the second a noise input, the third a received vehicle reflection, and the fourth a pavement reflection, thus representing all the possible signal varieties received in an entire cycle of operation. These wave forms are shown in their restored form, i.e., clamped to a particular voltage level as established by the presence of a Zener diode 242. Wave form B shows the same signals at point B in their detected form thus representing the envelopes of the signals received at point A. Detection is accomplished by the action of diode 243 and capacitor 244 in combination with resistor 245. Zener diode 242 limits the maximum negative potential at both points A and B sufficiently to prevent transistor 246 from breaking down due to reverse voltage being applied to its base emitter junction.

When a signal appears at point B, the base of transistor 246 is driven negative and results in transistor 246 shutting off. This allows capacitor 247 to charge through resistor 248 from the gate signal applied from receiver gate generator 3. If this signal is of sufficient duration, capacitor 247 will charge and reach a voltage level turning on transistor 249. This in turn will draw current from the anode gate of the silicon controlled switch 254, firing it and providing an output signal at its emitter terminal.

The silicon controlled switch 254 or SCS forms a part of the gate and memory unit 34. The output appearing at point E of SCS 254 will remain on until the end of the vehicle gate due to the bistable character of the device. Zener diode 250 establishes a fixed regulated bias point for the operation of transistor 249. The resistor-capacitor filter formed by resistor 245 and capacitor 244 on the base of transistor 246 has a relatively short time constant allowing transistor 246 to rapidly turn on upon the end of an incoming signal. This exactly controls the apparent duration of the received signal by rapidly discharging capacitor 247 upon the conduction of transistor 246.

Again referring to FIG. 7C, C shows the actual gate signal supplied at point C from the receiver gate generator 3. It is seen that the period defined by this gate signal encompasses both the noise signal, the reflected vehicle signal, and a short portion of the pavement reflection signal. The voltage signal appearing at point D is represented by the next series of curves. It shows that for the relatively short time signal, characteristic of the noise transients, capacitor 247 charges up to a value below that necessary to turn on transistor 249; while with respect to the actual vehicle signal, capacitor 247 charges up to a value sufficient to cause transistor 249 to conduct and results in a signal output from SCS 254. This is indicated by the leveling off of the depicted voltage signal and reference to wave form E. The wave form E depicts the voltage derived from the SCS 254 at the time when transistor is turned on.

The form representing that derived from the application of a pavement reflection has sufficient duration to turn on SCS 254 but since it occurs just prior to the end of the charging vehicle gate, the charging voltage for capacitor 247 is removed before its voltage reaches the required level. The received pavement signal still continues for some time after the gate is removed and capacitor 247 discharges slowly. At the end of the received signal, transistor 246 again turns on and the rapid discharge of capacitor 247 characteristic of all other received signals is again seen. The actuation of SCS 254 is maintained by the presence of the gate signal and therefore the signal appearing at point E only ceases upon ending the gate period. Due to the bistable characteristic of the silicon switch and the duration of the gate period, one and only one output signal can be produced for the receipt of one or more reflected vehicle signals during any gate period.

The apparent overlap in the applied gate voltage and the receipt of a pavement reflection, is provided to enable the system to respond to vehicle signals, of at least three millisecond duration occurring just prior to the end of the gate period. For example, referring to FIG. 7C, a vehicle reflection approximately one foot from the pavement would be received on the time scale indicated at approximately twenty-eight milliseconds after initiation of the transmission pulse. Thus capacitor 247 would commence charging two milliseconds prior to receipt of the pavement reflection and for three milliseconds after the pavement reflection is received but before the gate period ends; thus a vehicle presence detection signal would be provided. If this were not the case a vehicle signal received two milliseconds before the end of the gate would not achieve actuation of system detection. A drawback to this feature is that a noise signal received one millisecond prior to pavement reflection would also result in actuation of the system. The likelihood of this duration and occurrence of a noise pulse in conjunction with other conditions described hereinafter, however is small and thus this shortcoming is statistically insignificant.

As previously commented a system, as described up to this point, under most conditions provides sufficient security against false vehicle presence indications. It has, however, been found in actual practice that for conditions where the environment has a particularly high level of ambient noise and the associated control equipment generates high amplitude electrically coupled spurious signals, that the foregoing unique time character condition must be combined with the plurality pulse requirement to give the desired degree of immunity. This of course is based on the assumption that other performance requirements permit this combination.

PLURAL PULSE DETECTION

Figure 8A:
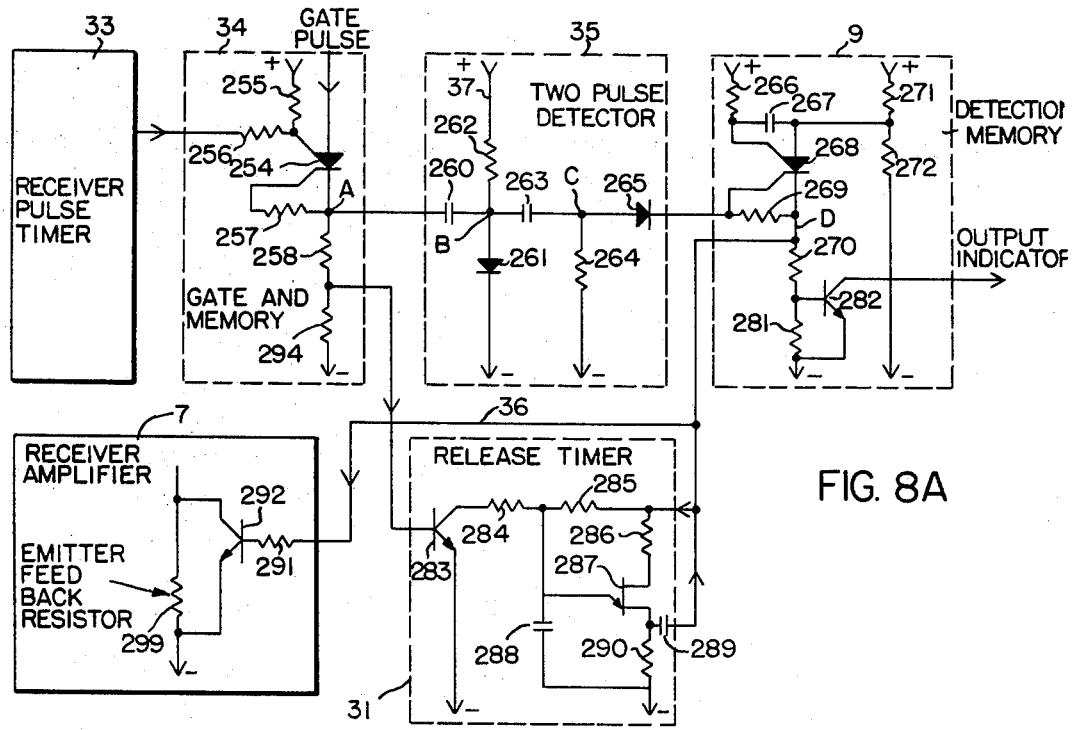
FIG. 8A is a block and schematic diagram of detector circuitry required for two successive pulse recognition, bistable output indication, release timer operation and receiver amplifier gain control in the system shown in FIG. 4.

When the gate and memory unit 34 is controlled to produce a signal from the SCS 254, this signal is applied to the two pulse detector unit 35, the circuitry of which is shown in FIG. 8A. This unit functions by adding to the system a second requirement for giving indication of vehicle presence. To satisfy this requirement a plurality of signals must be received from the gate and memory unit 34 within a given time interval before actuation of the detection memory unit 9. Therefore, in order to indicate the presence of a vehicle, a plurality of reflected signals having a peculiar characteristic must be received during a selected interval.

Figure 8B:
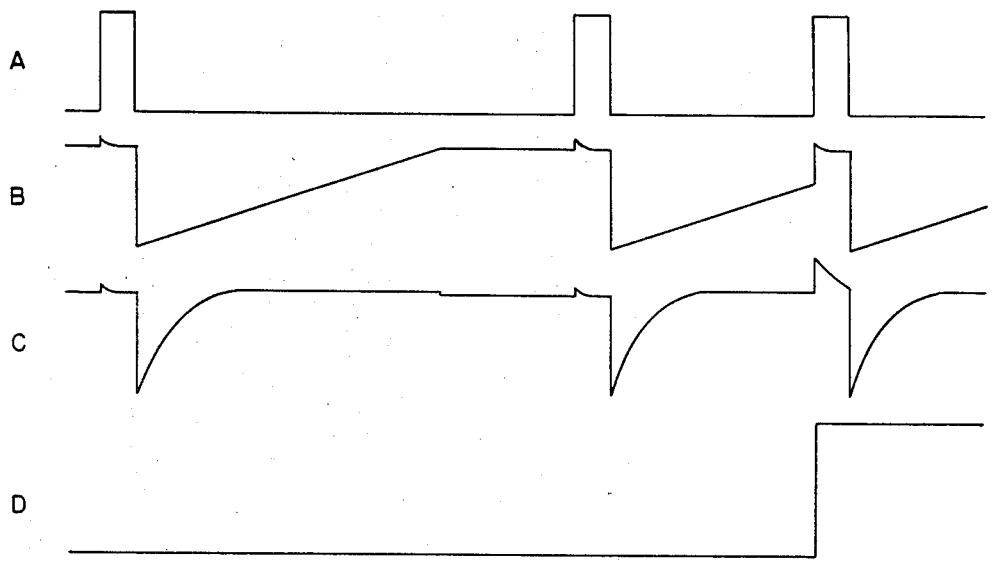
FIG. 8B contains wave shapes appearing at various points in the circuitry of FIG. 8A for explanatory purposes.

In detail, the presence of a signal at point A (the wave forms at various points in the circuit are depicted in FIG. 8B) results in charging capacitor 260 through diode 261 in a very short interval of time, producing a signal having a relatively short time constant. At the end of the gate period, the signal at point A goes toward zero, and the voltage appearing at point B increases negatively. In addition, the voltage appearing at point C must also follow this signal and go substantially negative. The time constant formed by resistor 262, capacitor 260, and resistor 258, is relatively long and results in a charging time greater than a single transmission cycle. The charge time of the capacitor 263 and resistor 264 combination on the other hand is relatively short and rapidly results in increasing the voltage at point C to approximately zero. In fact due to the long time constant for charging capacitor 260 the voltage appearing at point C goes slightly positive for a short duration.

If a second pulse is not received before capacitor 260 is fully charged, no output of signficant value will appear at point C upon the receipt of the next signal input at A. If, however, a second signal is received prior to completely charging capacitor 260, a positive going voltage signal will immediately appear at point A and at point B. This initiates an immediate increase in the voltage appearing at point C due to the charging current required for capacitor 263 and results in introducing through diode 265 a triggering signal to the detection memory unit 9. The mode of operation of this circuit points out the importance of the bistable or memory characteristic of the gate and memory unit 34, i.e. its limitation to only producing one output signal per transmission cycle in response to any number of signals indicative of a vehicle. For if this were not the case, the two pulse detector unit 35 would produce an output signal during any single transmission cycle in which more than one vehicle signal appears making the system insecure and susceptible to multiple reflections. The time constant of the capacitor 260-resistor 262 combination may be easily varied to change the required interval for sensing the two pulses. It may be extended to encompass an interval whereby two pulses received during three or more transmission cycles may be sufficient to cause vehicle presence indication.

The output signal derived at point C is applied to the cathode of another SCS 268 located in the detection memory unit 9. The output appearing at point D is then used to control circuitry and equipment giving distinctive indications of vehicle presence. In this particular embodiment, the signal at point D establishes a positive bias across resistors 270 and 281, and turns on transistor 282 which low impedance path is used to control actuation of indicators.

RELEASE TIMER

The system release feature extinguishes any indication of vehicle presence after a legitimate signal has not been received for a selected period. When the detection memory unit 9 is activated, it produces a signal which is conducted to a release timer unit 31, and commences this unit toward timing out. If the timer 31 is allowed to complete its timing cycle, it in turn produces a pulse which is applied to the SCS 268 in such a manner as to turn it off, thus ending vehicle presence indication. If, however, at any time during this timing cycle the gate and memory unit 34 produces a signal output, it resets the release timer 31 to its initial starting condition, thereby requiring once again that a pulse must be absent for the selected period before erasing vehicle indication.

In detail, when a signal appears at point D, capacitor 288, previously discharged through transistor 283, commences charging through resistor 285. As its voltage increases, it eventually makes unijunction transistor 287 conductive through load resistors 286 and 290 and a positive pulse is produced at point D. This positive signal reverses the polarity of applied voltage on SCS 268 and shuts it off, thereby extinguishing vehicle presence indication. If, however, before the voltage on capacitor 288 reaches the bias threshold value, SCS 254 is made conductive by the receiver pulse timer 33, the voltage across resistor 294 turns on transistor 283 and discharges capacitor 288 through resistor 284 to approximately zero. This brings capacitor 288 back to its initial condition, therefore requiring another full timing period before the release timer 31 can extinguish the vehicle presence indication. The positive going pulse which shuts off SCS 268 is generated through capacitor 289. Initially when unijunction transistor 287 is off, it charges to the level of voltage appearing across the series resistor combination 270 and 281. When unijunction transistor 287 conducts, the voltage appearing on the other side of the capacitor across resistor 290 goes positive, since the voltage across a capacitor cannot change instantaneously the same rise in voltage is reflected across resistors 270 and 281 resulting in SCS 268 turning off.

GAIN EXPANSION

For slow moving vehicles, variations in contours and materials throughout its length may cause loss of signal and prevent or prematurely extinguish a vehicle presence indication. A feedback signal on line 36, as shown in FIG. 8A, closes a transistor switch 292 and results in shorting out an emitter degenerative feedback resistor 299 present in one stage of the receiver amplifier 7. Thus once vehicle detection is acquired the gain of the receiver amplifier 7 is increased for prevention of stuttering or loss of indication due to momentary variations in reflections from slow moving vehicles. Transistor 292 is turned on through bias resistor 291 by the same signal that turns on the output indicator transistor 282 in the detection memory unit 9.

To further consider the aforedescribed advantages and features of the embodiment disclosed in FIGS. 4 through 8 and to fully understand their importance in the overall context of system operation and performance, a typical operational sequence for the system in a normal overhead application is presented.

OPERATION

In operation the time base generator unit 1 is adjusted to have a period of approximately one hundred milliseconds, which period is sufficiently long to be greater than the time between pulse transmission and pulse reflection from the pavement. A single transducer 5 is located overhead approximately eighteen feet above the surface of the pavement. The transmit pulse timer unit 200 when triggered by the time base generator 1 initiates a driving pulse of substantially single tonal frequency and of approximately five milliseconds duration from the transmitter unit 4. This pulse in turn causes the transducer 5 to generate a sonic pulse directed toward the surface of the pavement on a path intercepting passing vehicles.

The time base generator 1 output also is used to initiate the generation of a gating pulse, approximately twenty milliseconds in duration, from the receiver gate generator unit 3. This gate signal determines the vehicle gate period and is applied to the receiver amplifier 7, the receiver pulse timer 33, and the gate and memory unit 34, whereby each of these units is enabled during the vehicle gate period to respond to reflected signals. After transmission from the transducer 5 is initiated, if no vehicle or object is passing under the field of coverage of the transducer 5, a reflected signal from the pavement will be received and sensed by the transducer 5 in approximately thirty-five milliseconds. This time is located at the end of the gating period and the receiving equipment is designed so as not to respond to signals received at that point of the vehicle gate period. As a vehicle passes under the transducer 5 a reflected pulse from the next transmission is received by the transducer 5 from the surface of the vehicle. Such a pulse, hereinafter referred to as a vehicle signal, is conducted through the receiver isolator unit 6 to the receiver amplifier 7. The receiver isolator 6, as previously explained, isolates the receiver from the transmitter during the duration of transmit pulses but allows reflected signals to be received by the amplifier 7.

The gating pulse from the receiver gate generator 3 commences approximately fifteen milliseconds after the initiation of the transmit pulse, thus avoiding ringing signals from the transducer 5. The gate signal also controls the gain of the receiver amplifier 7 from a zero condition at the start of the detection cycle to a higher sensitivity at the end of the gate period.

The output of the receiver amplifier 7 in response to the reflected vehicle signal actuates the receiver pulse timer 33, if it is coincident with the gate signal and its duration is equal to or greater than three milliseconds. The receiver pulse timer unit 33 produces a single output signal in response to the reflected vehicle signal which is indicated by the response of the gate and memory unit 34. The output of the gate and memory unit 34 is registered by the two pulse detector 35 causing a capacitor 260 to commence charging. If during the next succeeding transmit cycle, i.e. after the third transmission pulse, a second reflected vehicle signal is received, the two pulse detector unit 35, conditioned by the first signal from the gate and memory unit 34, produces an output signal, due to the fact that the charge time for capacitor 260 is chosen so as to encompass approximately two transmission cycles. Should a second pulse not be received within this approximately one hundred thirty millisecond span of time, then the two pusle detector 35 returns to its normal condition and requires receipt of two additional pulses again during the selected charging interval in order to produce an output signal.

Upon production of an output signal by the two pulse detector 35, the detection memory unit 9 changes state and establishes an output indication indicative of vehicle presence. Response of the detection memory unit 9 also introduces a feedback signal on line 36, and increases the gain of the receiver amplifier unit 7, thus assuring maintenance of indication despite variations in the magnitude of the signal occurring during passage of vehicles. Further, the detection memory unit 9 commences operation of a timer unit 31 which is arranged so as to reset or extinguish the detection memory 9 if signals from the gate and memory unit 34 are not continuously received at a predetermined minimum rate having a period of approximately three hundred milliseconds. The release timer and increased gain features are entirely similar to that employed in the system disclosed in FIGS. 1 and 2.

In applications where information as to lane occupancy is required in addition to an indication of vehicle presence, the time constant of the release timer unit 31 is controlled to allow maintenance of the presence indication for a span of time approximating the system delay in indicating vehicle presence. Resistor 285 and capacitor 288 may be easily varied to provide the desired time constant. Since the lane occupancy parameter is an average value minor variances between the delay time and the release time become insignificant. Controlled delay of the release timer unit 31 in systems where detection is made with the receipt of a single target reflection is relatively inconsequential except that it should not be longer than the delay in detection if lane occupancy is desired.

To provide the invention described with greater adaptability for various operating conditions, other modifications with regard to specific parts of the system have been found to be advantageous. Primarily, such modifications concern the two pulse detector unit 35 and the receiver amplifier 7.

Figure 8C:
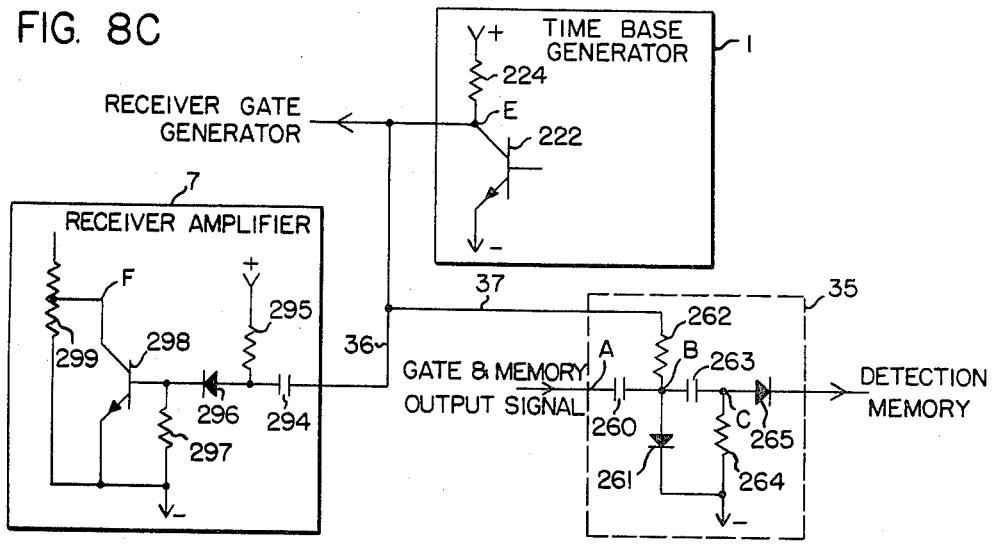
FIG. 8C is a functional block and schematic diagram showing an alternate form for the two successive pulse detection circuitry and gain control circuitry of FIG. 8A.

Referring to FIG. 8C, resistor 262 of the two pulse detector unit 35 is brought to the collector of transistor 222 in the time base generator unit 1 instead of to the (+) power supply. The circuitry previously described where resistor 263 is brought to the (+) side of the power supply fixes the charging time of capacitor 260 to a certain value irrespective of the period or rate of the time base generator 1. In other words, from the instant of cessation of a received signal from the gate and memory unit 34, the capacitor 260 is charged by the power supply driving voltage, if not interrupted by a second signal, for a fixed period of time, and should the period of the time base generator 1 be increased, for those applications where slow moving vehicles or objects may be involved, there exists the probability that no second pulse may be received prior to the voltage at point B reaching the zero level thus preventing vehicle indication from ever being given. On the other hand, if for some reason the period must be appreciably shortened, there exists the possibility that vehicle presence indication may be generated on non-successive intervals thus lessening the security of the system under certain operating parameters. The modification of FIG. 8C obviates this possible system ambiguity by forcing the charging time constant of capacitor 260 to be dependent upon the period or rate of the time base generator 1.

Figure 8D:
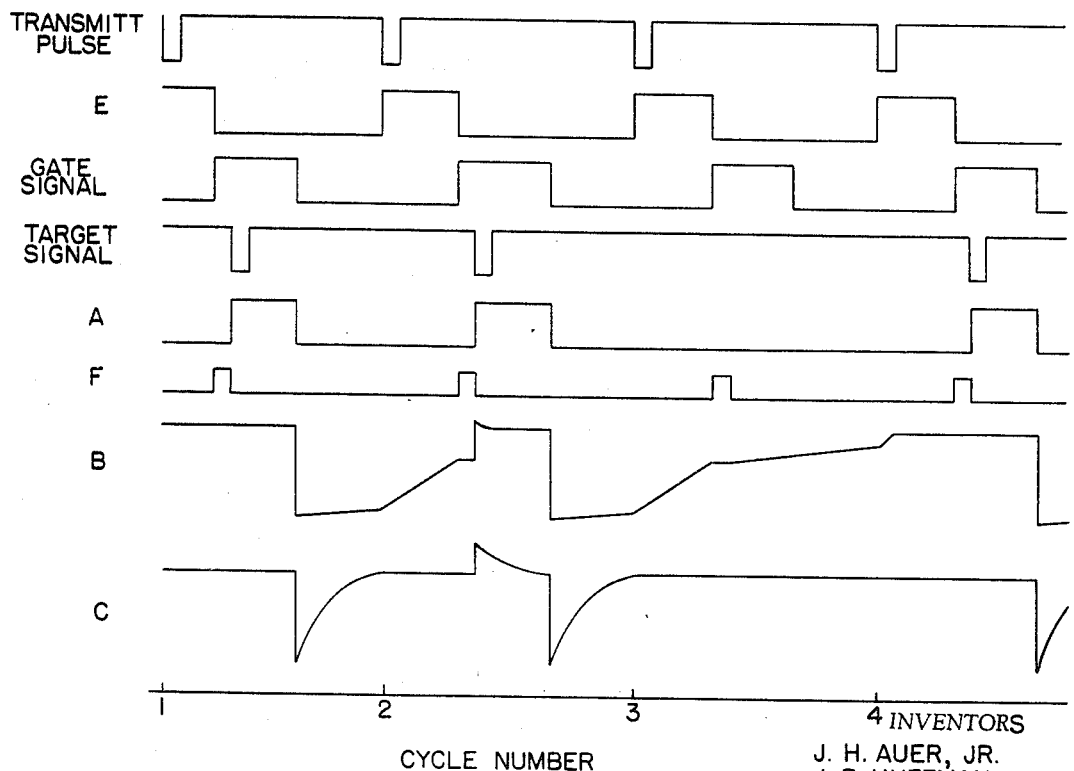
FIG. 8D is a graphical illustration of wave shapes occurring at various points in the circuitry of FIG. 8C for explanatory purposes.

Referring to FIG. 8C and FIG. 8D in coordination, the accomplishment of this desired result can be described. The graphical wave forms of FIG. 8D show the transmitted pulses from the transducer 5 recurring at regularly spaced intervals. The voltage on the collector of transistor 222 is also shown and is seen to reach a maximum point in coordination with the initiation of the transmit pulse. The gate signal is generated upon the collector voltage of transistor 222 going toward zero and lasts for a predetermined interval. Target reflections are shown as occurring at random somewhere within the interval of the applied gate signal. The wave shapes at point A are the output signals of the gate and memory unit 34 generated in response to the reception of target reflections. The wave forms at points B and C are also shown with respect to the reception of signals at point A. When the signal level at point A goes toward zero, the voltage at point B is forced to follow as is the voltage at point C in that the voltage across a capacitor cannot be instantaneously changed. From this point, the capacitor 260 commences to charge toward zero as determined by the voltage across diode 261. At the same time, capacitor 263 charges toward zero as determined by the same voltage but with a much shorter time constant. The charging time for capacitor 260 is chosen to be relatively large so that the rise toward zero is slow with a low voltage on point E. With the return of voltage at point E in the time base generator 1, capacitor 260 commences charging toward (+) voltage at a much greater rate since its driving source is now substantially above zero. Capacitor 260 continues to charge at this rate for the time that transistor 222 is turned off. After this time, it reutrns to charging at a slow rate, the same as initially established. If, however, a second signal is now received indicative of a target reflection, the voltage at point A again rises above zero and forces the voltage at point B to cross through zero which results in a definite positive signal appearing at point C of sufficient magnitude to cause alteration of the detection memory unit 9. Should, as indicated in the second and third cycles, no second target signal be received, then the capacitor 260 is charged for two fixed successive periods of time bringing the voltage at point B to zero and thereby establishing that two more successive pulses must be received before an indication of vehicle presence is given.

To recapitulate, since the charging source for capacitor 260 is applied for fixed periods of time, at a rate commensurate with the period of the time base generator 1, the relation of the selected interval for operation of the two pulse detector 35 to transmit cycles for normally anticipated base periods is maintained essentially constant.

A second modification shown in FIG. 8C concerns further control of the receiver amplifier 7 gain for those applications where it is found that the receiver transducer ringing is particularly troublesome. In these instances, it has been found desirable to provide a step gain function for the receiver amplifier 7, i.e. during times when no gate signal is applied the amplifier gain is approximately zero; during a second interval of short duration after the application of the gate signal, the gain is increased to a second level; and thence is finally increased to a third maximum level. This has been found to make the system substantially insensitive to signals produced by transducer ringing while still permitting maximum sensitivity to reflected signals occurring at times later in the gate interval. In the embodiment under consideration, as a matter of convenience, the anti-stutter feedback circuitry of the receiver amplifier 7 is replaced by the circuitry shown in FIG. 8C. The feedback line 36 is now brought to a capacitor 294. The capacitor 294 is in turn connected to the junction of resistor 295 and the anode of diode 296. The cathode of diode 296 is connected to the junction of the base of transtor 298 and resistor 297 and the collector of transistor 298 is connected to resistor 299, an emitter feedback resistor present in one stage of the receiver amplifier 7. The feedback line 36 is returned to the collector of transistor 222 in the time base generator and not to the cathode of SCS 268 of the detection memory unit 9. When the voltage appearing on the collector of transistor 222 (point E), goes toward zero, the voltage appearing at point F rises to some value greater than zero. This is established by the turning off of transistor 298, for when the voltage at point E goes towards zero the voltage appearing on the base of transistor 298 must also go toward zero, since the voltage across capacitor 294 can not instantaneously be changed. However, at a later time determined by the time constant of the resistor-capacitor combination of resistor 295 and capacitor 294 the voltage appearing on the base of transistor 298 will return to its prior positive value and cause transistor 298 to again become conductive. When transistor 298 is conductive it effectively shorts-out resistor 299 causing the gain of the receiver amplifier 7 to reach a maximum value. In sequence, in each cycle, as the gate signal is turned on, transistor 298 is turned off preventing the gain of the receiver amplifier 7 from rising above a second level. After a short time in the neighborhood of five to ten milliseconds, transistor 298 again turns on allowing the gain to reach its maximum designed value which is, of course, limited by the stability requirements of the amplifier. The gain of the amplifier is again substantially returned to zero upon the end of the gate signal and the aforedescribed step gain control is achieved. The maximizing of the receiver amplifier gain in this fashion does not preclude the necessity of providing an anti-stutter gain expansion feature in the system and both may be incorporated in a single system.

Thus has been described typical embodiments and operational sequences for sonic presence detector systems. The various implementations have been described to aid in the understanding of the operation and scope of the invention particularly with regard to actual system requirements. As previously outlined, the basic invention is susceptible to modification and alteration to best achieve the desired response and practical level of security for a given situation. This is particularly true with regard to the recognition circuitry where the unique time character and successive pulse requirements may be used either separately or in combination to reach the required level of security. It is further recognized that the invention of this disclosure may be utilized in a number of applications different from that described herein and that other modifications and rearrangements will necessarily become obvious to one skilled in the art. It is therefore, intended that the described invention encompass all those modifications and adaptations realizable from a reading and study of this disclosure.

What is claimed is:

1. An ultrasonic vehicle presence detector having transducer means normally emitting timed spaced compressional wave pulses, responding to reflections of the pulses and converting the reflected pulses to produce respective electrical pulses comprising,
(a) gating means for manifesting a gated interval during each of the time spaces,
(b) means for generating a coincidence signal during each gated interval in response to an electrical pulse produced during that interval by the transducer means provided it is above a given level,
(c) accumulating means for accumulating a signal level in accordance with the number of coincidence signals generated,
(d) normally inactive switching means rendered active only when a plurality of the coincidence signals is stored by the accumulating means for manifesting presence of an object within the range of the transducer means,
(e) means for intermittently partially discharging said accumulating means so that the accumulating means must store two coincidence signals generated during successive gated intervals to attain a signal level sufficient to render the switching means active, and
(f) means for rendering the switching means inactive after cessation of the electrical pulses occurring during the gated intervals.

2. An ultrasonic presence detector according to claim 1 wherein the means for rendering the switching means inactive comprises timing means controlled in part by the coincidence signals for timing an interval after the cessation of the coincidence signals and rendering the switching means inactive at the end of the timed interval.

3. An ultrasonic presence detector according to claim 1 wherein the duration of the gated interval is changed inversely to ambient temperature.

4. An ultrasonic presence detector according to claim 1 wherein the means for rendering the switching means inactive includes timing means for timing an interval corresponding to a plurality of successive gated interval during which no electrical pulse is received before rendering the switching means inactive.

5. An ultrasonic presence detector according to claim 4 wherein the interval timed by the timing means is for the same number of successive gated intervals that are used in rendering the switching means active.

6. An ultrasonic presence detector according to claim 1 wherein means is provided for maintaining the switching means active after having been rendered active in response to successive electrical pulses, even though some of such pulses are weaker than would be required to render the switching means active initially.

7. An ultrasonic presence detector having transducer means for emitting timed spaced compressional pulses, receiving reflections from objects of the pulses emitted and converting the compressional wave reflection pulses to produce respective electrical pulses comprising,
(a) gating means for manifesting a gated interval during each of the time spaces,
(b) binary switching means normally in a first condition and operable to a second condition for manifesting the presence of an object within range of the transducer means, and
(c) means for delaying operation of the switching means comprising,
(i) means for generating a coincidence signal during each gated interval in response to an electrical pulse produced by the transducer means during that interval,
(ii) storage means for accumulating the coincidence signals generated,
(iii) level monitoring means for controlling the binary switching means to the second condition in response to the storage means having accumulated a plurality of coincidence signals,
(iv) timing means for controlling the binary switching means to the first condition when no coincidence signal is generated for a predetermined time interval, and
(v) reset means for resetting the timing means when the switching means is in its second condition and a coincidence pulse is generated.

8. An ultrasonic presence detector according to claim 7 wherein means is provided responsive to the operation of the switching means to its second condition for increasing the sensitivity of the detector for an interval until the switching means is operated to its first condition.

9. In an ultrasonic presence detector having transmitting transducer means for emitting compressional wave pulses, electrical pulse generator means drivingly coupled to said transmitting transducer means for controlling the rate at which said compressional wave pulses are emitted, and receiving transducer means responsive to reflections of said compressional wave pulses from surfaces within the path of said compressional wave pulses for converting said compressional wave pulses to electrical energy, the combination comprising coincidence detector means responsive to said electrical pulse generator means and said receiving transducer means for producing an electrical signal each time said electrical pulse generator means and said receiving transducer means produce electrical energy contemporaneously, accumulator means responsive to said coincidence detector means for accumulating said electrical signals, switching means responsive to said accumulator means for initiating an output manifestation when said electrical signals on said accumulator means exceed a predetermined level, and timing means responsive to said coincidence detector means for permitting maintenance of the output manifestation produced by the switching means for a period time after said electrical pulse generator means and said receiving transducer means begin producing electrical energy noncontemporaneously.

10. The combination of claim 9 including means controlled in part by the output condition of said switching means for rendering said timing means operable only during production of said output manifestation.

11. The combination of claim 9 wherein said coincidence detector means comprises a silicon controlled switch including an anode, an anode gate, and a cathode, means coupling said anode to said electrical pulse generator means, means coupling said anode gate to said receiving transducer means, and means coupling said cathode to said accumulator means.

12. The combination of claim 11 including means controlled in part by the silicon controlled switch and in part by the output condition of said switching means for rendering said timing means operable only during production of said output manifestation.

13. A vehicle presence detection system comprising in combination,
(a) means for periodically emitting pulses of sonic energy having a peculiar characteristic distinguishing from coupled noise and respondingly generating signals relative to received sonic energy including sonic energy reflected from said object,
(b) means generating a periodic gate signal for a selected interval between successive sonic energy pulses,
(c) recognition means operably controlled by said periodic gate signal to be actuatable during said selected interval by only said electrical signals having a characteristic correlative to said peculiar characteristic, and
(d) detection means rendered operable only by plural actuation of said recognition means within a predetermined span of time to manifest a distinctive indication of object presence.

14. The system of claim 13 wherein said perculiar characteristic is peculiar time duration, and said recognition means is only actuated by said electrical signals having the same duration as and greater duration that said peculiar time duration.

15. The system of claim 14 wherein said predetermined span of time is controlled relative to the emission period of said sonic pulses including, accumulator means for rendering said detection means capable of manifesting an indication of object presence for an interval commenced by the actuation of said recognition means and enduring for a time required to change the level of said accumulator means to a predetermined value, which time is primarily determined by applying a signal to said accumulator means for fixed intervals at a rate corresponding to the emission period of said sonic pulses.

16. The system of claim 14 wherein,
(a) said recognition means can only be actuated once during each said selected interval by said electrical signals, and
(b) said detection means is rendered operable by two actuations of said recognition means occurring within said predetermined span of time.

17. The system of claim 16 wherein said predetermined span of time encompasses only two successive selected intervals.

18. A method for detecting the presence of vehicles comprising,
(a) periodically emitting pulses of sonic energy having a peculiar characteristic distinguishing from coupled noise,
(b) respondingly generating signals relative to received sonic energy including sonic energy reflected from said vehicles,
(c) recognizing only said signals having attributes correlative to said peculiar characteristics during selected intervals, and
(d) establishing a distinctive indication of vehicle presence whenever a plurality of signals are recognized during said predetermined span of time.

19. The method of claim 18 wherein two of said signals must be recognized during said predetermined span of time each said signal occurring during successive single periods of the emitted pulses before establishing said distinctive indication.

References Cited

UNITED STATES PATENTS

| | | | |
|---|---|---|---|
| 3,176,266 | 3/1965 | Auer | 340—38 |
| 3,290,490 | 12/1966 | Auer | 340—38 |
| 3,255,434 | 6/1966 | Schwarz | 340—38 |
| 2,948,854 | 8/1960 | Bess | 328—111 X |

RODNEY D. BENNETT, Jr., Primary Examiner

JOSEPH G. BAXTER, Assistant Examiner

U.S. Cl. X.R.

328—111; 340—38